(12) United States Patent
Sannodo et al.

(10) Patent No.: US 9,205,843 B2
(45) Date of Patent: Dec. 8, 2015

(54) DECELERATION FACTOR ESTIMATING DEVICE AND DRIVE ASSISTING DEVICE

(75) Inventors: Shinya Sannodo, Susono (JP); Hirotada Otake, Sunto-gun (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/376,288

(22) PCT Filed: Feb. 3, 2012

(86) PCT No.: PCT/JP2012/052556
§ 371 (c)(1),
(2), (4) Date: Aug. 1, 2014

(87) PCT Pub. No.: WO2013/114624
PCT Pub. Date: Aug. 8, 2013

(65) Prior Publication Data
US 2015/0006052 A1 Jan. 1, 2015

(51) Int. Cl.
*B60W 40/107* (2012.01)
*B60W 30/18* (2012.01)
*B60W 40/13* (2012.01)
*B60W 40/00* (2006.01)

(52) U.S. Cl.
CPC ....... *B60W 40/107* (2013.01); *B60W 30/18109* (2013.01); *B60W 40/00* (2013.01); *B60W 40/13* (2013.01); *B60W 30/18127* (2013.01); *B60W 2530/10* (2013.01); *B60W 2550/142* (2013.01); *B60W 2550/402* (2013.01); *B60W 2720/106* (2013.01)

(58) Field of Classification Search
CPC ... B60W 40/107; B60W 40/00; B60W 40/13; B60W 30/18109; B60W 2720/106; B60W 2530/10; B60W 2550/402; B60W 30/18127; B60W 2550/142

USPC .......................................................... 701/70
See application file for complete search history.

(56) References Cited

U.S. PATENT DOCUMENTS

| 2005/0010356 A1 | 1/2005 | Ishiguro et al. |
| 2009/0043473 A1* | 2/2009 | Nakai et al. ................... 701/70 |

FOREIGN PATENT DOCUMENTS

| JP | 10-104049 | 4/1998 |
| JP | 2002-364741 | 12/2002 |
| JP | 2004-301576 | 10/2004 |
| JP | 2011-16465 | 1/2011 |
| JP | 2011-22643 | 2/2011 |

OTHER PUBLICATIONS

International Search Report issued Feb. 28, 2012, in PCT/JP12/052556 filed Feb. 3, 2012.

* cited by examiner

*Primary Examiner* — Mary Cheung
*Assistant Examiner* — Anne Mazzara
(74) *Attorney, Agent, or Firm* — Oblon, McClelland, Maier & Neustadt, L.L.P.

(57) ABSTRACT

A deceleration factor estimating device that estimates a deceleration factor of a vehicle includes a road load calculating unit configured to calculate a road load estimated value, and a filtering calculating unit configured to perform filtering processing of extracting a predetermined frequency component of the road load estimated value calculated by the road load calculating unit. The filtering calculating unit extracts a vehicle-originated road load component, an environment-originated road load component, and the like by filtering the road load estimated value to extract a certain predetermined frequency component.

16 Claims, 12 Drawing Sheets

DECELERATION FACTOR ESTIMATING DEVICE AND DRIVE ASSISTING DEVICE

FIELD

The present invention relates to a deceleration factor estimating device and a drive assisting device.

BACKGROUND

Conventionally, drive assisting devices that are mounted in vehicles and assist traveling of the vehicles are known. In order to assist the traveling of a vehicle, such a drive assisting device determines the behavior of the vehicle based on various characteristics of the vehicle. Here, there are various characteristics of the vehicle that vary in accordance with the conditions at the time of traveling. As a device that detects such varying characteristics of a vehicle, for example, there is a device described in Patent Literature 1. In Patent Literature 1, a system that calculates the traveling energy of a vehicle is described. This system determines the traveling energy by calculating grade resistance, air resistance, acceleration resistance, and rolling resistance based on an estimated traveling speed, parameters relating to the vehicle, and parameters relating to a road. In addition, in Patent Literature 2, a device that estimates the weight of a vehicle is described.

CITATION LIST

Patent Literature

Patent Literature 1: Japanese Patent Application Laid-open No. 2011-16465
Patent Literature 2: Japanese Patent Application Laid-open No. 10-104049

SUMMARY

Technical Problem

Here, the characteristics of the vehicle include characteristics relating to deceleration, in other words, characteristics that represent resistance against traveling at the time of traveling. The vehicle calculates such deceleration factors and performs various kinds of control based on a result of the calculation, whereby the vehicle can be appropriately controlled. The deceleration factors of a vehicle include those that vary in accordance with the conditions at the time of traveling. Such deceleration factors of a vehicle that vary in accordance with the conditions at the time of traveling include the air resistance and the rolling resistance described in Patent Literature 1 and a vehicle weight described in Patent Literature 2. While in Patent Literatures 1 and 2 each deceleration factor is estimated by calculating various conditions, there are cases where an estimated deceleration factor and an actual deceleration factor deviate from each other so that the accuracy of the estimation is lowered.

The present invention is made in consideration of the above-described circumstances, and an object thereof is to provide a deceleration factor estimating device and a drive assisting device capable of estimating deceleration factors with higher accuracy.

Solution to Problem

In order to achieve the above mentioned object, a deceleration factor estimating device according to the present invention that estimates a deceleration factor of a vehicle, the deceleration factor estimating device includes a road load calculating unit configured to calculate a road load estimated value; and a filtering calculating unit configured to perform filtering processing of extracting a predetermined frequency component of the road load estimated value.

Further, it is preferable that the filtering calculating unit extracts a total road load component by performing filtering processing on the road load estimated value with a first time constant, extracts a vehicle-originated road load component by performing filtering processing on the road load estimated value with a second time constant that has a period longer than that of the first time constant, and calculates an environment-originated road load component by subtracting the vehicle-originated road load component from the total road load component.

Further, it is preferable to further include a deceleration factor estimating unit configured to include the road load calculating unit and the filtering calculating unit; a driving force acquiring unit configured to acquire a driving force of the vehicle; a vehicle speed acquiring unit configured to acquire a vehicle speed of the vehicle; and an acceleration acquiring unit configured to acquire an acceleration of the vehicle, wherein the deceleration factor estimating unit preferably estimates a plurality of deceleration factors including the road load estimated value based on a relation among the acquired driving force, the acquired speed and the acquired acceleration.

Further, it is preferable that the deceleration factor includes at least one of an air resistance coefficient and a vehicle weight, and the deceleration factor estimating unit stops estimation of at least one of the air resistance coefficient and the vehicle weight at the time the environment-originated road load component is a threshold value or more.

Further, it is preferable that the deceleration factor includes at least one of an air resistance coefficient and a vehicle weight, and the deceleration factor estimating unit stops estimation of at least one of the air resistance coefficient and the vehicle weight at the time an amount of change of the environment-originated road load component is a threshold value or more.

Further, it is preferable that the deceleration factor estimating unit determines one deceleration factor to be estimated based on the vehicle speed and the acceleration.

Further, it is preferable that the deceleration factor estimating unit analyzes a relation among the deceleration factor, the driving force, the speed, and the acceleration by using an equation of motion, and estimates the deceleration factor.

In order to achieve the above mentioned object, a drive assisting device according to the present invention includes the deceleration factor estimating device according to any one of the above description; and a drive assisting control unit configured to execute drive assistance using a deceleration factor estimated by the deceleration factor estimating device.

Further, it is preferable that the drive assisting control unit stops the drive assistance at the time the environment-originated road load component is a threshold value or more.

Further, it is preferable that the drive assisting control unit stops the drive assistance at the time an amount of change of the environment-originated road load component is a threshold value or more.

Further, it is preferable to further include a vehicle behavior stability control detecting unit configured to detect an operation of vehicle behavior stability control, wherein the drive assisting control unit preferably stops the drive assistance at the time the operation of the vehicle behavior stability control is detected by the vehicle behavior stability control detecting unit.

Advantageous Effects of Invention

The present invention has such effects that a road load component due to a mechanical loss of a vehicle, which is included in a road load, can be estimated, and deceleration factors are estimated with high accuracy.

DESCRIPTION OF EMBODIMENTS

Hereinafter, embodiments according to the present invention will be described in detail based on the drawings. Note that the present invention is not limited to these embodiments. In addition, constituent elements of the embodiments described below include those that one skilled in the art can replace with or easily replaces with or those that are substantially the same.

Figure 1:
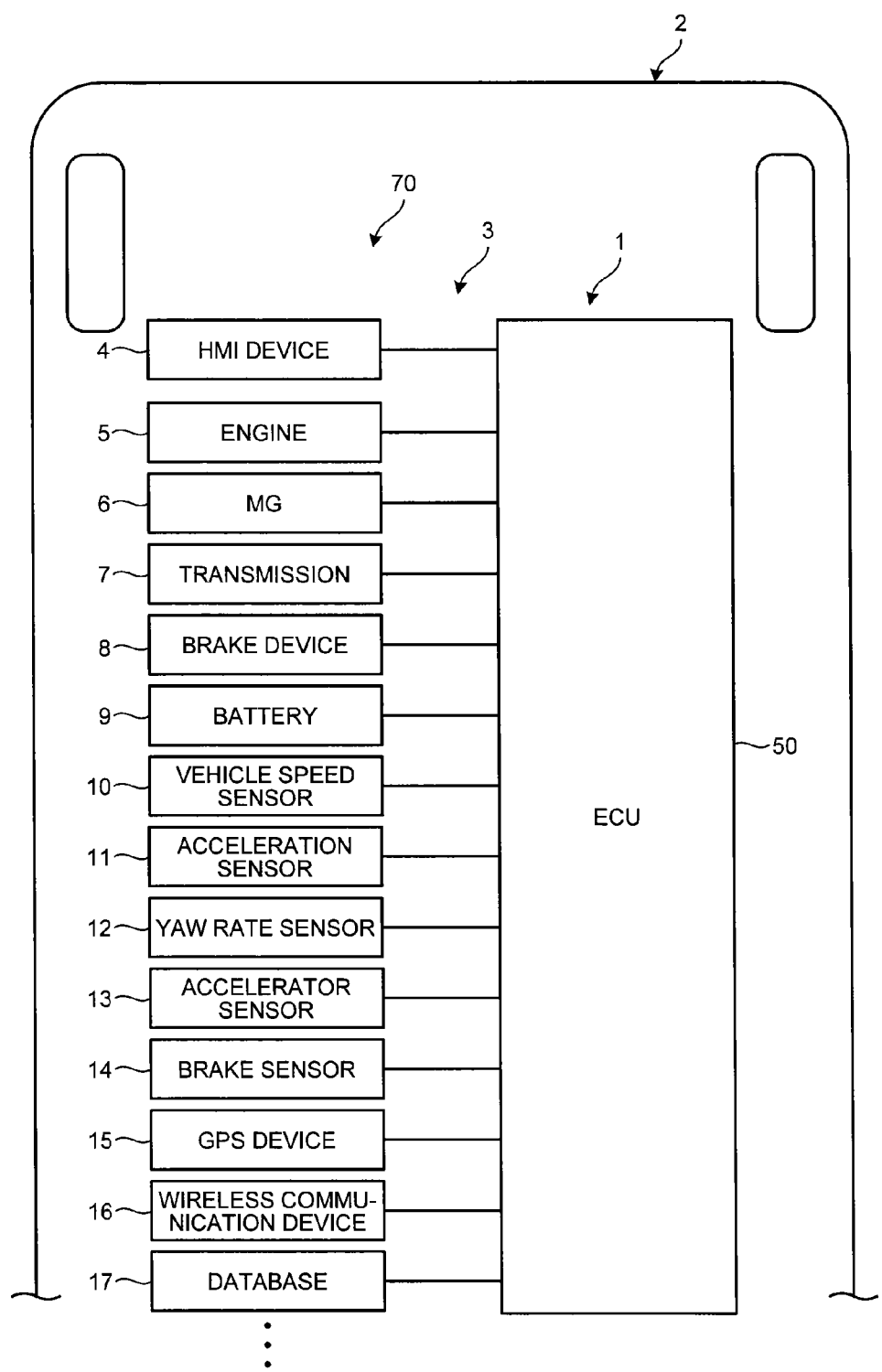
FIG. 1 is a schematic configuration diagram that illustrates a vehicle control system.
Figure 2:
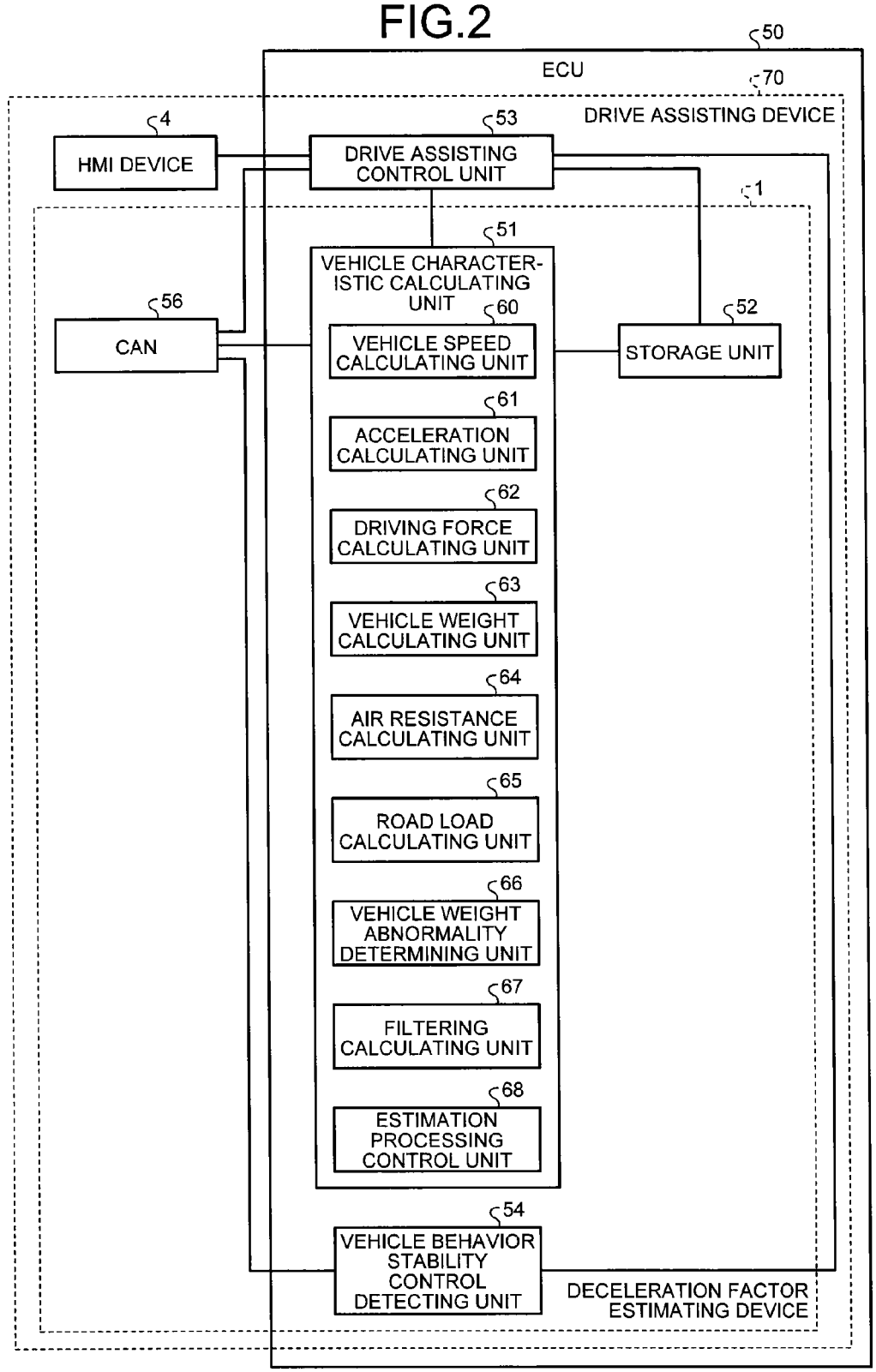
FIG. 2 is a block diagram that illustrates an example of schematic configurations of an ECU, a deceleration factor estimating device, and a drive assisting device.

FIG. 1 is a schematic configuration diagram that illustrates a vehicle control system, and FIG. 2 is a block diagram that illustrates an example of schematic configurations of an ECU, a deceleration factor estimating device, and a drive assisting device.

A deceleration factor estimating device 1 and a drive assisting device 70 of this embodiment, as illustrated in FIG. 1, are applied to a vehicle control system 3 that is mounted in a vehicle 2. The deceleration factor estimating device 1 includes an ECU (Electronic Control Unit) 50. The deceleration factor estimating device 1 performs various kinds of calculation using the ECU 50 in accordance with the situations, thereby estimating deceleration factors. The drive assisting device 70 of this embodiment includes the ECU 50 that includes the deceleration factor estimating device 1. The drive assisting device 70 estimates the traveling state by using deceleration factors estimated by the deceleration factor estimating device 1 of the ECU 50, controls based on the result an HMI device (assisting device) 4, a driving source (an engine 5 or an MG 6), and the like and executes various kinds of drive assistance, thereby assisting the traveling of the vehicle 2.

The vehicle control system 3 of this embodiment is also so-called a hybrid system in which the engine 5 and the MG 6 are combined to be used as traveling driving sources for rotary driving of drive wheels of the vehicle 2. In other words, the vehicle 2 is a hybrid vehicle that includes the MG 6 as a traveling driving source in addition to the engine 5. While the vehicle 2 operates the engine 5 in a state having efficiency as high as possible, the vehicle 2 is configured to improve the fuel economy by compensating for excess/deficiency of power or an engine brake force using the MG 6 that is a rotary electric machine and further regenerating energy at the time of deceleration.

More specifically, the vehicle control system 3 includes: the HMI device 4; the engine 5 as an internal-combustion engine; the motor-generator (hereinafter, it may be also referred to as an "MG") 6 as an electric motor; a transmission 7; a brake device 8; a battery 9; and the like. In addition, the vehicle control system 3 includes: a vehicle speed sensor 10; an acceleration sensor 11; a yaw rate sensor 12; an accelerator sensor 13; a brake sensor 14; a GPS (Global Positioning System) device (hereinafter, it may be also referred to as a "GPS") 15; a wireless communication device 16; a database (hereinafter, it may be also referred to as a "DB") 17; and the like.

The HMI device 4 is an assisting device that can output drive assisting information that is information assisting the drive of the vehicle 2 and is a device that performs provision of the drive assisting information to a driver, and the like. The HMI device 4 is an in-vehicle device and, for example, includes a display device (visual information display device), a speaker (sound output device) and the like that are disposed in the interior of the vehicle 2. As the HMI device 4, an existing device, for example, a display device and a speaker of a navigation system may be used. In order that improvement of the fuel economy can be realized, the HMI device 4 provides information such as sound information and visual information (graphic information or character information), and guides a driver's drive operation. The HMI device 4 assists the realization of a target value by the driver's drive operation by providing such information. The HMI device 4 is electrically connected to the ECU 50 and is controlled by the ECU 50. Note that the HMI device 4, for example, may be configured to include a tactile information output device, which outputs tactile information such as steering wheel vibration, seat vibration and a pedal reaction force, and the like.

The vehicle control system 3 has the engine 5, the MG 6, the transmission 7, the brake device 8, a battery 9, and the like mounted therein as various actuators realizing the traveling of the vehicle 2.

The engine 5 causes a driving force to act on the vehicle wheels of the vehicles 2 in accordance with a driver's acceleration request operation, for example, an accelerator pedal depressing operation. The engine 5 generates engine torque as the torque of the engine by consuming fuel as traveling power caused to act on the drive wheels of the vehicle 2. In short, the engine 5 is a heat engine that outputs heat energy generated by burning fuel in the form of mechanical energy such as torque, and a gasoline engine, a diesel engine, an LPG engine, and the like are examples thereof. The engine 5, for example, includes a fuel injecting device, an ignition device, a throttle valve device, and the like, and such devices are electrically connected to the ECU 50 and are controlled by the ECU 50. The output torque of the engine 5 is controlled by the ECU 50. Note that power generated by the engine 5 may be used for electric power generation in the MG 6.

The MG 6 causes a driving force to act on the drive wheels of the vehicle 2 in accordance with a driver's acceleration request operation, for example, an accelerator pedal depressing operation. The MG 6 converts electrical energy into mechanical power as traveling power caused to act on the drive wheels of the vehicle 2 and generates motor torque. The MG 6 is so-called a rotary electric machine that includes a stator and a rotor. The MG 6 is an electric motor that converts electrical energy into mechanical power to output the converted mechanical power and is also a power generator that converts mechanical power into electrical energy to collect the electrical energy. In other words, the MG 6 has both a function (power running function) as an electric motor that is driven by the supply of electric power and converts electrical energy into mechanical energy to output the converted mechanical energy and a function (regeneration function) as a power generator that converts mechanical energy into electrical energy. The MG 6 is electrically connected to the ECU 50 through an inverter performing conversion between a DC current and an AC current and is controlled by the ECU 50. The output torque and the amount of electric power generation of the MG 6 are controlled through the inverter by the ECU 50.

The transmission 7 is a power transmission device that shifts the speed of the rotation output by the engine 5 or the MG 6 to transmit the resultant rotation to the drive wheel side of the vehicle 2. The transmission 7 may be so-called a manual transmission (MT) or so-called an automatic transmission such as a stepped automatic transmission (AT), a continuously variable automatic transmission (CVT), a multi-mode manual transmission (MMT), a sequential manual transmission (SMT), and a dual clutch transmission (DCT). Here, the transmission 7 will be described as a continuously variable automatic transmission, for example, using a planetary gear train or the like. In the transmission 7, a transmission actuator and the like are electrically connected to the ECU 50, and the transmission 7 is controlled by the ECU 50.

The brake device 8 causes a braking force to act on the vehicle wheels of the vehicle 2 in accordance with a driver's brake requesting operation, for example, a brake pedal depressing operation. The brake device 8 generates a predetermined frictional force (frictional resistance force) between friction elements, for example, brake pads, brake disks, and the like, thereby imparting a braking force to the vehicle wheels that are rotatably supported by the vehicle body of the vehicle 2. Accordingly, the brake device 8 can generate a braking force at the contact face between the vehicle wheels of the vehicle 2 and the road surface and brake the vehicle 2. In the brake device 8, a brake actuator and the like are electrically connected to the ECU 50, and the brake device 8 is controlled by the ECU 50.

The battery 9 is an electric storage device that can store electric power (electricity storage) and discharge the stored electric power. The battery 9 is electrically connected to the ECU 50 and output signals relating to various kinds of information to the ECU 50. The battery 9 of this embodiment detects an SOC (State of Charge) as information of the charge state and outputs the SOC to the ECU 50.

In the case of functioning as an electric motor, the MG 6 is supplied with the electric power stored in the battery 9 through the inverter, and converts the supplied electric power into traveling power of the vehicle 2 to output the converted power. In addition, in the case of functioning as a power generator, the MG 6 is driven by the input power to generate electric power, and charges the battery 9 through the inverter using the generated electric power. At this time, the MG 6, can brake (regenerative braking) the rotation of the rotor using the rotational resistance generated in the rotor. As a result, at the time of regenerative braking, the MG 6 can generate motor regeneration torque that is negative motor torque in the rotor by the regeneration of electric power and, as a result, can impart a braking force to the drive wheels of the vehicle 2. In other words, in this vehicle control system 3, mechanical power is input from the drive wheels of the vehicle 2 to the MG 6, and accordingly, the MG 6 generates electric power by the regeneration, whereby the kinetic energy of the vehicle 2 can be collected as electric energy. Then, the vehicle control system 3 transmits the mechanical power (negative motor torque) generated in the rotor of the MG 6 in accordance therewith to the drive wheels, and thereby can perform regenerative braking using the MG 6. In this case, in the vehicle control system 3, when the amount of regeneration (the amount of electric power generation) by the MG 6 is made relatively small, the generated braking force becomes relatively small, and the deceleration acting on the vehicle 2 becomes relatively small. On the other hand, in the vehicle control system 3, when the amount of regeneration (the amount of electric power generation) by the MG 6 is made relatively large, the generated braking force becomes relatively large, and the deceleration acting on the vehicle 2 becomes relatively large.

The vehicle speed sensor 10, the acceleration sensor 11, the yaw rate sensor 12, the accelerator sensor 13, and the brake sensor 14 are state detecting devices that detect the traveling states of the vehicle 2 and driver's inputs to the vehicle 2 (driver inputs), in other words, state amounts and physical amounts relating to driver's actual operations for the vehicle 2. The vehicle speed sensor 10 detects the vehicle speed of the vehicle 2 (hereinafter, it may be referred to as a "vehicle speed"). The acceleration sensor 11 detects the acceleration of the vehicle 2. Note that the acceleration sensor 11 of this embodiment detects at least the acceleration in the forward/backward direction of the vehicle 2. The yaw rate sensor 12 detects the yaw rate of the vehicle 2. The accelerator sensor 13 detects the degree of opening of the accelerator that is the amount of a driver's accelerator pedal operation (the amount of depressing). The brake sensor 14 detects the amount of a driver's brake pedal operation (the amount of depressing), for example, master cylinder pressure and the like. The vehicle speed sensor 10, the acceleration sensor 11, the yaw rate sensor 12, the accelerator sensor 13, and the brake sensor 14 are electrically connected to the ECU 50 and output detection signals to the ECU 50.

The GPS device 15 is a device that detects the current location of the vehicle 2. The GPS device 15 receives GPS signals output by GPS satellites and performs position measurement/calculation of GPS information (X coordinate: X, and Y coordinate: Y) that is the location information of the vehicle 2 based on the received GPS signals. The GPS device 15 is electrically connected to the ECU 50 and outputs a signal relating to the GPS information to the ECU 50.

The wireless communication device 16 is a prediction information acquitting device that acquires prediction information relating to the traveling of the vehicle 2 using wireless communication. The wireless communication device 16 acquires the prediction information using wireless communication, for example, from a road-to-vehicle communication device (road-side device) such as an optical beacon disposed on the road side, an inter-vehicle communication device that is installed in another vehicle, a device that exchanges information using a communication infrastructure such as the Internet through a VICS (Vehicle Information and Communication System, registered trademark) center or the like, and the like. The wireless communication device 16, as the prediction information, for example, acquires preceding vehicle information, following vehicle information, signal information, construction work/traffic regulation information, traffic jam information, emergency vehicle information, information relating to accident history database, and the like. For example, the signal information includes location information of a traffic light at the front in the traveling direction of the vehicle 2, signal cycle information such as a lighting cycle of a blue signal, a yellow signal, and a red signal and signal changing timing, and the like. The wireless communication device 16 is electrically connected to the ECU 50 and outputs signals relating to the prediction information to the ECU 50.

The database 17 stores various kinds of information. The database 17 stores: map information that includes road information; various kinds of information and learning information that are obtained in actual traveling of the vehicle 2; prediction information that is acquired by the wireless communication device 16; and the like. For example, the road information includes: road grade information; road surface state information; road shape information; vehicle speed limit information; road curvature (curve) information; temporary stop information; stop line location information; and the like. The information stored in the database 17 is referred to by the ECU 50 as is appropriate, and necessary information is read. Note that while the database 17 here is illustrated to be installed in the vehicle 2 in the figure, the configuration is not limited thereto, and the database may be configured to be disposed at an information center or the like outside the vehicle 2 and be appropriately referred to by the ECU 50 through wireless communication or the like so as to read necessary information. The database 17 of this embodiment stores information of the location (actual stop location) at which the vehicle 2 stops at a traffic light, an intersection, or the like, at which a reference stop location such as a stop line is disposed, as learning information. The database 17 stores the information of the actual stop location for each reference stop location.

The ECU 50 is a control unit that performs overall control of the entire vehicle control system 3 and, for example, is configured as an electronic circuit having a known microcomputer including a CPU, a ROM, a RAM, and an interface as the main body. Detection results detected by the vehicle speed sensor 10, the acceleration sensor 11, the yaw rate sensor 12, the accelerator sensor 13, and the brake sensor 14, the GPS information acquired by the GPS device 15, the prediction information acquired by the wireless communication device 16, various kinds of information stored in the database 17, a drive signal of each unit, and electric signals corresponding to a control instruction and the like are input to the ECU 50. The ECU 50 controls the HMI device 4, the engine 5, the MG 6, the transmission 7, the brake device 8, the battery 9, and the like in accordance with such input electric signals. The ECU 50, for example, executes the drive control of the engine 5, the drive control of the MG 6, the speed shifting control of the transmission 7, the brake control of the brake device 8, and the like based on the degree of opening of the accelerator, the vehicle speed, and the like. In addition, the ECU 50, for example, uses the engine 5 and the MG 6 in a combining or selective manner in accordance with the drive states, and thereby can realize various types of vehicle traveling (traveling modes) in the vehicle 2.

In addition, the ECU 50 can detect turning-on/off of the accelerator operation that is a driver's acceleration request operation for the vehicle 2 and the degree of opening of the accelerator, for example, based on the detection result by the accelerator sensor 13. Similarly, the ECU 50 can detect turning on/off of the brake operation that is a driver's brake request operation for the vehicle 2, for example, based on the detection result by the brake sensor 14. Note that the state in which the driver's accelerator operation is turned off is a state in which a driver's acceleration request operation for the vehicle 2 is released, and the state in which the driver's accelerator operation is turned on is a state in which a driver's acceleration request operation for the vehicle 2 is performed. Similarly, the state in which the driver's brake operation is turned off is a state in which a driver's brake request operation for the vehicle 2 is released, and the state in which the driver's brake operation is turned on is a state in which a driver's brake request operation for the vehicle 2 is performed. In addition, the ECU 50 detects power requested by the driver based on the degree of opening of the accelerator.

Hereinafter, an example of schematic configurations of the ECU 50, the deceleration factor estimating device, and the drive assisting device will be described with reference to the block diagram of FIG. 2. The ECU 50, as illustrated in FIG. 2, includes a vehicle characteristic calculating unit 51, a storage unit 52, a drive assisting control unit 53, and a vehicle behavior stability control detecting unit 54.

The vehicle characteristic calculating unit 51, the storage unit 52, and the vehicle behavior stability control detecting unit 54 are included in the deceleration factor estimating device 1. The deceleration factor estimating device 1 may include various sensors detecting the vehicle states and various information acquiring units supplying peripheral information in addition to the ECU 50. Instead of including various sensors detecting the vehicle states and various information acquiring units supplying peripheral information, the deceleration factor estimating device 1 may include a communication unit that acquires information from various sensors detecting the vehicle states and various information acquiring units supplying peripheral information as an acquisition unit.

In addition, the deceleration factor estimating device 1 and the drive assisting control unit 53 are included in the drive assisting device 70. The drive assisting device 70 also includes driving sources such as the engine 5 and the MG 6 (not illustrated in the figure) and the HMI device 4 in addition to the ECU 50. The drive assisting device 70, similar to the deceleration factor estimating device 1, may include various sensors detecting the vehicle states and various information acquiring units supplying peripheral information. The drive assisting device 70, similar to the deceleration factor estimating device 1, instead of including various sensors detecting the vehicle states and various information acquiring units supplying peripheral information, may include a communication unit that acquires information from various sensors detecting the vehicle states and various information acquiring units supplying peripheral information as an acquisition unit.

Here, the vehicle characteristic calculating unit 51, the drive assisting control unit 53, and the vehicle behavior stability control detecting unit 54 of the ECU 50 are connected to actuator ECUs controlling various actuators such as an engine control ECU, an MG control ECU, a transmission control ECU, a brake control ECU, and a battery control ECU and sensors through a CAN (Control Area Network) 56 built as an in-vehicle network. The vehicle characteristic calculating unit 51, the drive assisting control unit 53, and the vehicle behavior stability control detecting unit 54 acquire control values of various actuators and detection values of sensors as vehicle information through the CAN 56.

The vehicle characteristic calculating unit 51 calculates various characteristics of the vehicle 2, in this embodiment, the deceleration factors of the vehicle 2. More specifically, the vehicle characteristic calculating unit 51 acquires various kinds of information through the CAN 56 and estimates the deceleration factors of the vehicle 2 by analyzing the acquired information.

The vehicle characteristic calculating unit 51 includes: a vehicle speed calculating unit (vehicle speed acquiring unit) 60; an acceleration calculating unit (acceleration acquiring unit) 61; a driving force calculating unit (driving force acquiring unit) 62; a vehicle weight calculating unit 63; an air resistance calculating unit 64; a road load calculating unit 65; a vehicle weight abnormality determining unit 66; a filtering calculating unit 67; and an estimation processing control unit 68. In the deceleration factor estimating device 1, a configuration including the vehicle weight calculating unit 63, the air resistance calculating unit 64, the road load calculating unit 65, the vehicle weight abnormality determining unit 66, the environment-originated RL (road load) calculating unit 67, and the estimation processing control unit 68 of the vehicle characteristic calculating unit 51 forms a deceleration factor estimating unit. The vehicle speed calculating unit 60, the acceleration calculating unit 61, and the driving force calculating unit 62 acquire various parameters used for estimating the deceleration factors.

The vehicle speed calculating unit 60 is a calculation unit that acquires the vehicle speed of the vehicle 2. The vehicle speed calculating unit 60 can acquire the vehicle speed of the vehicle 2 by acquiring a detection value of the vehicle speed sensor 10 through the CAN 56. Note that the vehicle speed calculating unit 60 may directly acquire the acquired detection value of the vehicle speed sensor 10, as the vehicle speed of the vehicle 2 or may acquire the vehicle speed of the vehicle 2 by performing calculation processing on the detection value of the vehicle speed sensor 10.

The acceleration calculating unit 61 is a calculation unit that acquires the acceleration of the vehicle 2. The acceleration calculating unit 61 can acquire the acceleration of the vehicle 2 by acquiring the detection value of the acceleration sensor 11 through the CAN 56. Note that the acceleration calculating unit 61 may directly acquire the acquired detection value of the acceleration sensor 11, as the vehicle speed of the vehicle 2 or may acquire the vehicle speed of the vehicle 2 by performing calculation processing on the detection value of the acceleration sensor 11. Furthermore, the acceleration calculating unit 61 may calculate the acceleration without using the detection value of the acceleration sensor 11. For example, the acceleration calculating unit 61 may acquire the acceleration by differentiating the vehicle speed detected by the vehicle speed sensor 10.

The driving force calculating unit 62 is a calculation unit that acquires the driving force of the vehicle 2. The driving force calculating unit 62 can acquire the driving force of the vehicle 2 by acquiring detection values of the drive conditions of the engine 5 and the MG 6 through the CAN 56 and performing calculation of the detection values. For example, the driving force calculating unit 62 can perform calculation by calculating the number of revolutions of the engine 2, the output of the MG 6, and the like based on various conditions. In addition, the driving force calculating unit 62 may acquire the driving force by acquiring and calculating values of loads (engine brake and regenerative brake) generated in the engine 5 and the MG 6 when the driver does not perform a brake operation at the time of deceleration. Furthermore, the driving force calculating unit 62 may acquire the detection value of the accelerator sensor 13, in other words, the degree of opening of the accelerator through the CAN 56 and acquire the driving force of the vehicle 2 from the acquired degree of opening of the accelerator.

The vehicle weight calculating unit 63 is a calculation unit that estimates a vehicle weight. The air resistance calculating unit 64 is a calculation unit that estimates an air resistance coefficient. The road load calculating unit 65 is a calculation unit that estimates a road load. The calculation that is executed by the vehicle weight calculating unit 63, the air resistance calculating unit 64, and the road load calculating unit 65 will be described later. Here, the road load (traveling resistance) is resistance that is generated between the driving source and the road surface and includes road surface resistance generated between tires and the road surface, resistance (mechanical loss) generated in a drive system transmitting a driving force generated by the driving source, and the like. As above, in the vehicle characteristic calculating unit 51 of this embodiment, the vehicle weight, the air resistance coefficient, and the road load that are estimated by the vehicle weight calculating unit 63, the air resistance calculating unit 64, and the road load calculating unit 65 become deceleration factors.

The vehicle weight abnormality determining unit 66 determines whether or not the estimated vehicle weight is abnormal. The vehicle weight abnormality determining unit 66 acquires the estimated vehicle weight from the vehicle weight calculating unit 63 and determines the vehicle weight to be abnormal in a case where the estimated vehicle weight exceeds a threshold value. The vehicle weight abnormality determining unit 66 sends a result of the determination to the estimation processing control unit 68. Note that the vehicle weight abnormality determining unit 66 may be disposed integrally with the estimation processing control unit 68.

The filtering calculating unit (environment-originated RL (road load) calculating unit) 67 performs filtering processing on the data of the estimated value of the road load that is calculated by the road load calculating unit 65, and extracts a predetermined frequency component. More specifically, the filtering calculating unit 67 performs the filtering processing on the data of the estimated value of the road load and extracts the predetermined frequency component, thereby extracting a vehicle-originated road load component. In addition, the filtering calculating unit processes the extracted component, thereby extracting an environment-originated road load component. The vehicle-originated road load component is a component in the road load that includes resistance (mechanical loss) generated in a drive system transmitting a driving force generated by the driving source. The environment-originated road load component is a component in the road load that includes road surface resistance generated between the tires and the road surface. The processing of extracting the vehicle-originated road load component and the environment-originated road load component using the filtering calculating unit 67 will be described later.

The estimation processing control unit 68 controls the processing of each unit of the vehicle characteristic calculating unit 51. The estimation processing control unit 68 determines whether or not the processing of estimating a vehicle weight is to be executed using the vehicle weight calculating unit 63, whether or not the processing of estimating an air resistance coefficient is to be executed using the air resistance calculating unit 64, and whether or not the processing of estimating a road load is to be executed using the road load calculating unit 65 based on the vehicle speed acquired by the vehicle speed calculating unit 60 and the acceleration acquired by the acceleration calculating unit 61 and causes execution of processing of estimating various deceleration factors based on the determination. In addition, the estimation processing control unit 68 determines whether or not processing of estimating the air resistance coefficient and the road load is to be stop, based on the environment-originated road load component. The processing executed by the estimation processing control unit 68 will be described later.

Next, the storage unit 52 stores values calculated by the vehicle characteristic calculating unit 51 and values necessary for various kinds of calculation. The storage unit 52 stores estimated values of deceleration factors calculated at least in the current state. Note that while the storage unit 52 is disposed inside the ECU 50 in this embodiment, necessary information may be stored in the database 17.

Next, the drive assisting control unit 53, for example, is a calculation unit that corresponds to an ITS (Intelligent Transport Systems) and includes a calculation unit for performing infrastructure cooperation or NAVI cooperation. The drive assisting control unit 53 executes prediction information eco drive assisting processing utilizing so-called prediction information. In other words, the drive assisting control unit 53 performs drive having a high fuel economy improvement effect utilizing the prediction information, and thereby the vehicle control system 3 assists the eco drive. Accordingly, the vehicle control system 3 can improve the fuel economy by suppressing the consumption of fuel. For the purpose of assisting driver's eco drive, the drive assisting control unit 53 outputs drive assisting information to the HMI device 4, and guides and assists a driver's operation. In addition, the drive assisting control unit 53 performs switching between turning-on/off of the engine at the time of stopping traveling as drive assistance.

The drive assisting control unit 53 acquires information of a route in which the vehicle 2 travels subsequently based on various kinds of information acquired through the CAN 56, for example, location information acquired by the GPS device 15, the signal cycle of a traffic light to be passed through that is acquired by the wireless communication device 16, and the like. In addition, the drive assisting control unit 53 acquires the current traveling state (the vehicle speed, the remaining amount of the battery, and the like) through the CAN 56. The drive assisting control unit 53 can execute drive assistance by using the information of the route in which the vehicle 2 travels subsequently, the current traveling state, and each deceleration factor calculated by the deceleration factor estimating device 1.

The drive assisting control unit 53 controls the engine 5 in accordance with the situations and executes various kinds of drive assistance, thereby performing traveling assistance that has a high fuel economy improvement effect and is comfortable for the driver. More specifically, the drive assisting control unit 53 acquires information of stop locations such as traffic lights and intersections and determines whether or not it is necessary to stop in the traveling direction. In a case where the vehicle 2 is determined to be stopped, the drive assisting control unit 53 identifies a target stop location from the information of the locations of stop lines present at traffic lights, intersections, and the like and controls turning-on/off of the engine 5 based on the traveling speed of the vehicle 2 during traveling, a distance up to the target stop location, and power requested by the driver and input by a driver's operation.

In addition, the drive assisting control unit 53 controls the HMI device 4 in accordance with the situations and outputs various kinds of drive assisting information, thereby performing assistance urging the driver to perform drive having a high fuel economy improvement effect. The drive assisting control unit 53 causes various kinds of drive assisting information to be output from the HMI device 4 based on the target traveling state amount of the vehicle 2 during traveling, thereby performing guidance and assistance urging the driver to perform a recommended drive operation, typically, a drive operation accompanying a change. Here, the target traveling state amount, typically, is a target traveling state amount of the vehicle 2 at a predetermined point or at predetermined timing in the vehicle 2 during traveling. The drive assisting control unit 53 controls the HMI device 4 based on a target traveling state amount at a predetermined point and predetermined timing, causes drive assisting information to be output from the HMI device 4 and performs assistance urging the driver to perform a recommended drive operation, thereby performing drive assistance such that the traveling state amount of the vehicle 2 becomes the target traveling state amount at the predetermined point and the predetermined timing.

The drive assisting control unit 53 is not limited to one that outputs the drive assisting information guiding an accelerator turning-off operation or a brake turning-on operation as visual information. The deceleration factor estimating device 1, for example, may be one that outputs the drive assisting information as sound information, tactile information, or the like or may be configured to appropriately change the form of the sound information or the tactile information. The configuration of the drive assisting control unit 53 of this embodiment will be described later.

The vehicle behavior stability control detecting unit 54 detects whether or not control for stabilizing the behavior of the vehicle, mainly control of the braking force is being executed. As the control for stabilizing the behavior of the vehicle, there are ABS (Anti-lock Brake System) control, VCS (Vehicle Control System) control, TRC (Traction Control System) control, and the like. Note that the TRC control is also referred to as TCS (Traction Control System) control or TCL (Traction Control) control. The vehicle behavior stability control detecting unit 54 determines whether or not various kinds of control are being executed, based on the vehicle information acquired from the CAN 56. The vehicle behavior stability control detecting unit 54 sends a result of the detection to the estimation processing control unit 68 of the vehicle characteristic calculating unit 51 and the drive assisting control unit 53.

Figure 3:
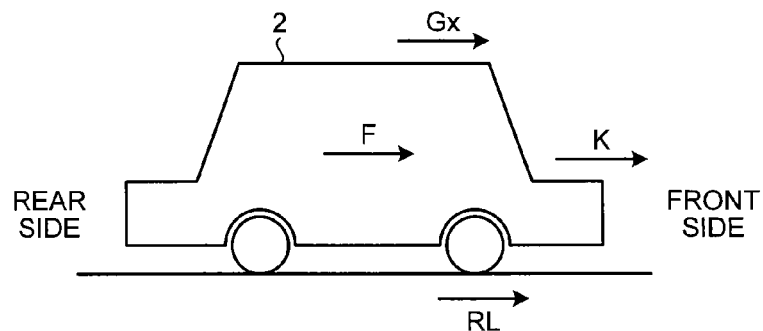
FIG. 3 is an explanatory diagram that schematically illustrates forces acting on a vehicle.

Next, an example of the processing of the deceleration factor estimating device 1 will be described with reference to FIGS. 3 to 18. First, deceleration factors estimated by the deceleration factor estimating device 1 will be described. FIG. 3 is an explanatory diagram that schematically illustrates forces acting on the vehicle. By applying the forces acting on the vehicle 2 during traveling to an equation of motion, Expression 1 described below is formed.

$$F = Gx \cdot M + K \cdot Vx^2 + RL \qquad \text{(Expression 1)}$$

Here, F is a driving force, Gx is acceleration, M is a vehicle weight (car weight), K is an air resistance coefficient, Vx is a vehicle speed, and RL is a road load. Note that for each parameter in the expression described above, in a case where the vehicle 2 travels in the forward direction at the vehicle speed Vx, a direction of an arrow in FIG. 3 becomes the positive direction. In addition, basically, when the driving force F is generated from the driving source, for the vehicle 2 during traveling, air resistance and a road load are generated in a direction opposite to the direction of the driving force F of the vehicle 2, in order words, so as to decrease the speed of the vehicle 2. Accordingly, basically, the values of K and RL become negative values. In addition, as the vehicle weight M increases, the acceleration decreases.

By determining four terms among five terms of Expression 1 described above, the deceleration factor estimating device 1 can calculate the value of the remaining one term. Here, among the terms of the expression described above, the acceleration Gx, the vehicle speed Vx, and the driving force F are terms that can be acquired by acquiring from respective detection values of the vehicle or by calculating the respective detection values of the vehicle. Accordingly, by determining values of two deceleration factors among the vehicle weight M, the air resistance coefficient K, and the road load RL, the deceleration factor estimating device 1 can estimate the value of the remaining one deceleration factor.

Here, the estimation processing control unit 68 of the deceleration factor estimating device 1 of this embodiment determines a term of a deceleration factor to be estimated based on the acceleration Gx and the vehicle speed Vx. In other words, in a case where the acceleration Gx and the vehicle speed Vx satisfy a predetermined condition, the estimation processing control unit 68 performs the processing of estimating a deceleration factor satisfying the condition. Accordingly, in a case where the acceleration Gx and the vehicle speed Vx do not satisfy a deceleration factor estimation condition, the estimation processing control unit 68 does not perform the processing of estimating the deceleration factor.

Figure 4:
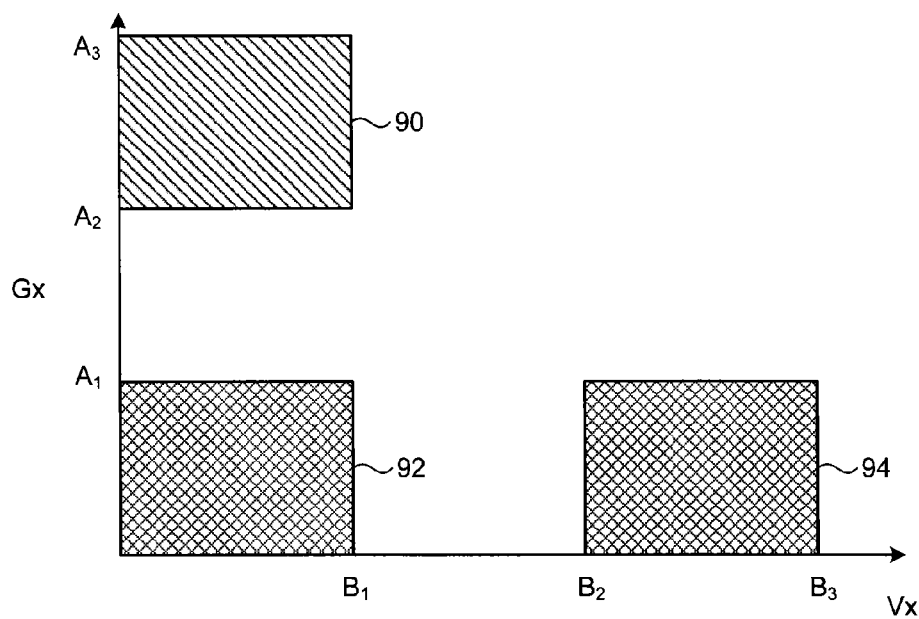
FIG. 4 is an explanatory diagram that illustrates a relation among a deceleration factor to be estimated, a speed, and acceleration.

FIG. 4 is an explanatory diagram that illustrates a relation among a deceleration factor to be estimated, a speed, and acceleration. Here, in FIG. 4, the vertical axis is the acceleration Gx [m/s$^2$], and the horizontal axis is the vehicle speed Vx [km/h]. In addition, acceleration $A_1$, $A_2$, and $A_3$ and speeds $B_1$, $B_2$, and $B_3$ are threshold values. As an example, the acceleration $A_2$ may be set to 1.0 [m/s$^2$], and the speed $B_2$ may be set to 50.0 [km/h]. In this embodiment, the acceleration $A_1$ and the speed $B_1$ become first threshold values, the acceleration $A_2$ and the speed $B_2$ become second threshold values, and first threshold value<second threshold value.

In a case where the acceleration Gx is more than the acceleration $A_2$ (second threshold value) and is less than the acceleration $A_3$, and the vehicle speed Vx is less than the vehicle speed $B_1$ (first threshold value), in other words, the traveling condition in FIG. 4 is included in an area 90, the estimation processing control unit 68 estimates a vehicle weight M1 among the deceleration factors. Here, M1 is an estimated vehicle weight. The vehicle weight M1 is calculated using Expression 2 described below.

$$M1 = \frac{F - K \cdot Vx^2 - RL}{Gx} \quad \text{(Expression 2)}$$

In a case where the acceleration Gx is more than the acceleration $A_2$ (second threshold value) and less than the acceleration $A_3$, and the vehicle speed Vx is less than the vehicle speed $B_1$ (first threshold value), the term of Vx$^2$ decreases with respect to the term of the acceleration Gx, and accordingly, influence of the term of Vx$^2$ of the expression described above decreases. In addition, since the acceleration Gx is more than $A_2$, the influence of RL relatively decreases. Accordingly, in a case where the acceleration Gx is more than the acceleration $A_2$ and less than the acceleration $A_3$, and the vehicle speed Vx is less than the vehicle speed $B_1$, the estimation processing control unit 68 can estimate the vehicle weight M1 while decreasing the influence of errors in the other deceleration factors. K and RL are estimated values (previous values) read from the storage unit 52 and calculated in the current state. Note that while the acceleration $A_3$ in this embodiment is set as the upper limit of the acceleration for executing the estimation, the upper limit of the acceleration may not be set.

Next, in a case where the acceleration Gx is less than the acceleration $A_1$ (first threshold value), and the vehicle speed Vx is more than the vehicle speed $B_2$ (second threshold value) and less than the vehicle speed $B_3$, in other words, in a case where the traveling condition in FIG. 4 is included in an area 94, the estimation processing control unit 68 estimates the air resistance coefficient K1 among the deceleration factors. Here, K1 is an estimated air resistance coefficient. The air resistance coefficient K1 is calculated using Expression 3 described below.

$$K1 = \frac{F - Gx \cdot M - RL}{Vx^2} \quad \text{(Expression 3)}$$

In a case where the acceleration Gx is less than the acceleration $A_1$, and the vehicle speed Vx is more than the vehicle speed $B_2$ and less than the vehicle speed $B_3$, the influence of the term of Gx of the expression described above decreases with respect to the term of Vx$^2$. In addition, since the vehicle speed Vx is more than the vehicle speed $B_2$ and less than the vehicle speed $B_3$, the influence of RL relatively decreases. Accordingly, in a case where the acceleration Gx is less than the acceleration $A_1$, and the vehicle speed Vx is more than the vehicle speed $B_2$, the estimation processing control unit 68 can estimate the air resistance coefficient K1 while decreasing the influence of errors in the other deceleration factors. M and RL are estimated values (previous values) read from the storage unit 52 and calculated in the current state. Note that while the speed $B_3$ in this embodiment is set as the upper limit of the speed for executing the estimation, the upper limit of the speed may not be set.

Next, in a case where the acceleration Gx is less than the acceleration $A_1$ (first threshold value), and the vehicle speed Vx is less than the speed $B_1$ (first threshold value), in other words, in a case where the traveling condition in FIG. 4 is included in an area 92, the estimation processing control unit 68 estimates the road load RL1 among the deceleration factors. Here, RL1 is an estimated road load. The road load RL1 is calculated using Expression 4 described below.

$$RL1 = F - Gx \cdot M - K \cdot Vx^2 \quad \text{(Expression 4)}$$

In a case where the acceleration Gx is less than the acceleration $A_1$, and the vehicle speed Vx is less than the speed $B_1$, the influences of both terms of Vx$^2$ and Gx on F decrease. Accordingly, in a case where the acceleration Gx is less than the acceleration $A_1$, and the vehicle speed Vx is less than the speed $B_1$, the estimation processing control unit 68 can estimate the road load RL1 while decreasing the influence of errors in the other deceleration factors. M and K are estimated values (previous values) read from the storage unit 52 and calculated in the current state.

Figure 5:
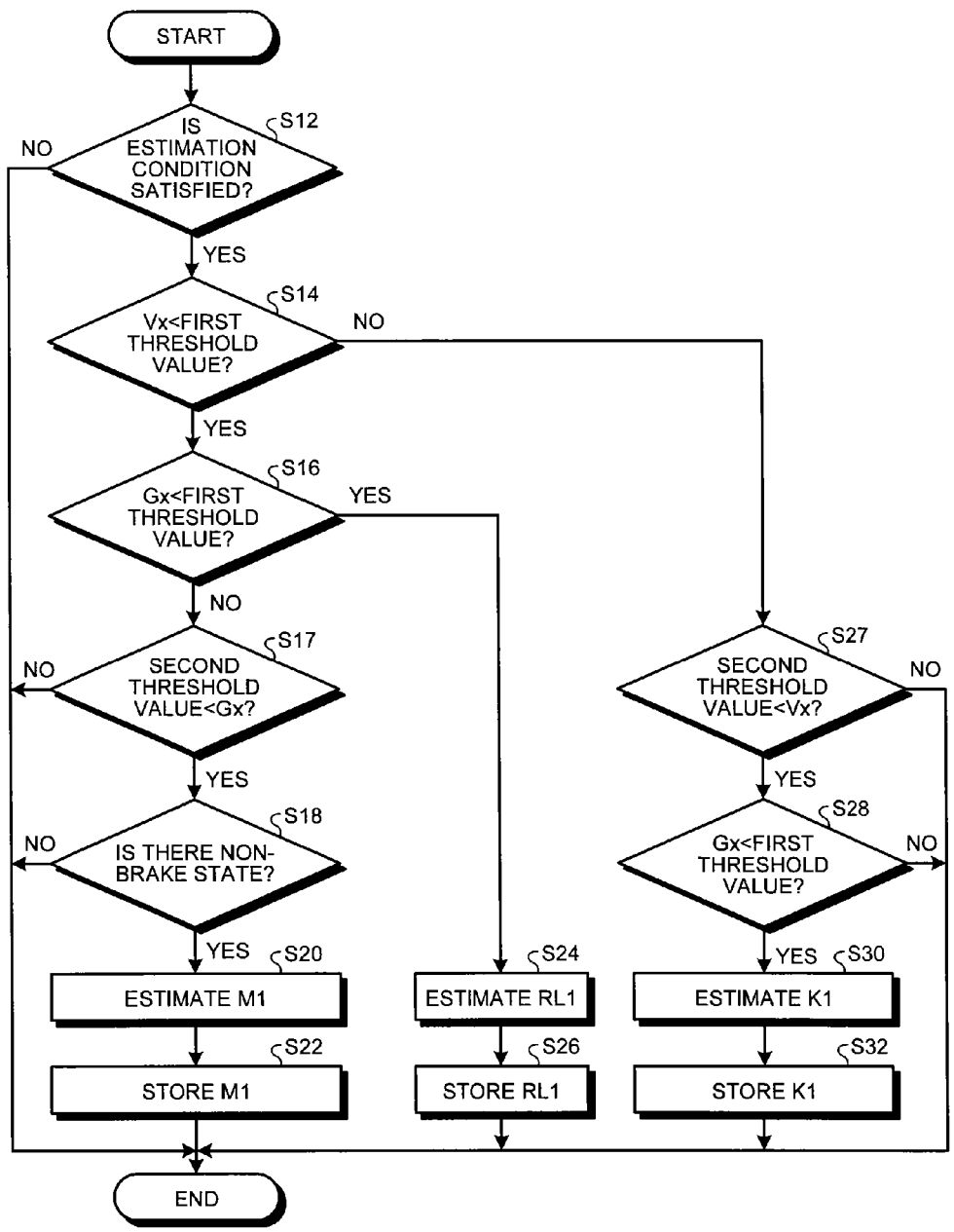
FIG. 5 is a flowchart that illustrates an example of control by the ECU.

Next, an example of the procedure of the processing by the estimation processing control unit 68 will be described with reference to FIG. 5. FIG. 5 is a flowchart that illustrates an example of control by the ECU 50. The estimation processing control unit 68 performs various kinds of processing determination based on the value calculated by each unit of the vehicle characteristic calculating unit 51 and the states of the vehicle 2 that are acquired from the CAN 56, controls the operation of each unit of the vehicle characteristic calculating unit 51, and thereby can execute the processing illustrated in FIG. 5.

The estimation processing control unit 68 determines in Step S12 whether or not the estimation condition is satisfied. Here, the estimation condition is determined based on a shift position, a vehicle speed, and a yaw rate. Note that the shift position can be acquired by detecting the state of the transmission 7 through the CAN 56. In a case where there are satisfied all the conditions that the shift position is the drive, the vehicle speed Vx is more than zero (0<Vx), and the yaw rate YR is less than a threshold value (YR<threshold value), the estimation processing control unit 68 determines that the estimation condition is satisfied. In other words, in a case where the vehicle 2 is moving and is not turned by a threshold value or more in the state in which the driving force of the driving source is transmitted, the estimation processing control unit 68 determines that the estimation condition is satisfied. In a case where it is determined in Step S12 that the estimation condition is not satisfied (No), the estimation processing control unit 68 ends this processing.

In a case where the estimation condition is determined to be satisfied (Yes) in Step S12, the estimation processing control unit 68 determines in Step S14 whether or not vehicle speed Vx<first threshold value, in other words, whether or not the vehicle speed Vx is less than the first threshold value (for example, the speed $B_1$). In a case where the estimation processing control unit 68 determines in Step S14 that Vx<first threshold value (Yes), the processing proceeds to Step S16, and in a case where it is determined that not Vx<first threshold value (No), in other words, in a case where it is determined that Vx≥first threshold value, the processing proceeds to Step S27.

In a case where Yes is determined in Step S14, the estimation processing control unit 68 determines in Step S16 whether or not Gx<first threshold value, in other words, whether or not the acceleration Gx is less than the first threshold value (for example, the acceleration $A_1$). In a case where the estimation processing control unit 68 determines in Step S16 that not Gx<first threshold value (No), in other words, that acceleration Gx≥first threshold value, the processing proceeds to Step S17, and in a case where it is determined that acceleration Gx<first threshold value (Yes), the processing proceeds to Step S24.

In a case where No is determined in Step S16, the estimation processing control unit 68 determines in Step S17 whether or not second threshold value<acceleration Gx, in other words, whether or not the acceleration Gx is more than the second threshold value (for example, the acceleration $A_2$). In a case it is determined in Step S17 that not second threshold value<acceleration Gx (No), in other words, that acceleration Gx≤second threshold value, the estimation processing control unit 68 ends this processing. In other words, in a case where the vehicle speed Vx is less than the first threshold value, and the acceleration Gx is the first threshold value or more and the second threshold value or less, for example, in a case where the traveling condition is between the areas 90 and 92 in FIG. 4, the estimation processing control unit 68 ends this processing without performing an estimation. In a case where the estimation processing control unit 68 determines that second threshold value<acceleration Gx (Yes), the processing proceeds to Step S18. Note that in a case where Yes is determined in Step S17, the estimation processing control unit 68 may determine whether or not acceleration Gx<third threshold value (for example, the acceleration $A_3$), and allow the processing to proceed to Step S18 only in a case where acceleration Gx<third threshold value.

In a case where Yes is determined in Step S17, the estimation processing control unit 68 determines in Step S18 whether or not there is a non-braking state. In other words, it is determined whether or not a brake operation is detected by the brake sensor 14. In a case where it is determined in Step S18 that there is no non-braking state (No), in other words, in a case where it is determined that the brake operation is detected by the brake sensor 14, the estimation processing control unit 68 ends this processing. In other words, in a case where the brake operation is being executed, the estimation processing control unit 68 ends this processing without performing estimation. In a case where it is determined in Step S18 that there is a non-braking state (Yes), in other words, in a case where it is determined that the brake operation is not detected by the brake sensor 14, the estimation processing control unit 68 estimates the vehicle weight M1 in Step S20. Here, the estimation of the vehicle weight M1 is executed by the vehicle weight calculating unit 63 using the expression described above. When the vehicle weight M1 is estimated in Step S20, the estimation processing control unit 68 stores the vehicle weight M1 estimated in Step S22 in the storage unit 52 and ends this processing.

In a case where Yes is determined in Step S16, the estimation processing control unit 68 estimates the road load RL1 in Step S24. Here, the estimation of the road load RL1 is executed by the road load calculating unit 65 using the expression described above. When the road load RL1 is estimated in Step S24, the estimation processing control unit 68 stores the road load RL1 in the storage unit 52 in Step S26 and ends this processing.

In a case where No is determined in Step S14, the estimation processing control unit 68 determines whether or not second threshold value<vehicle speed Vx, in other words, whether the vehicle speed Vx is more than the second threshold value (for example, the speed $B_2$) in Step S27. In a case where it is determined in Step S27 that not second threshold value<vehicle speed Vx (No), in other words, in a case where it is determined that vehicle speed Vx second threshold value, the estimation processing control unit 68 ends this processing. In other words, in a case where the vehicle speed Vx is the first threshold value or more and the second threshold value or less, for example, the traveling condition is between the areas 92 and 94 in FIG. 4, the estimation processing control unit 68 ends this processing without performing estimation. In a case where the estimation processing control unit 68 determines that second threshold value<vehicle speed Vx (Yes), the processing proceeds to Step S28. Note that in a case where Yes is determined in Step S27, the estimation processing control unit 68 may determine whether or not vehicle speed Vx<third threshold value (for example, the speed $B_3$), and allow the processing to proceed to Step S28 only in a case where vehicle speed Vx<third threshold value.

In a case where Yes is determined in Step S27, the estimation processing control unit 68 determines in Step S28 whether or not acceleration Gx<first threshold value, in other words, whether or not the acceleration Gx is less than the first threshold value (for example, the acceleration $A_1$). In a case where it is determined in Step S28 that not acceleration Gx<first threshold value (No), in other words, in a case where it is determined that acceleration Gx≥first threshold value, the estimation processing control unit 68 ends this processing.

In a case where it is determined in Step S28 that acceleration Gx<first threshold value (Yes), the estimation processing control unit 68 estimates the air resistance coefficient K1 in Step S30. Here, the estimation of the air resistance coefficient K1 is executed by the air resistance calculating unit 64 using the expression described above. When the air resistance coefficient K1 is estimated in Step S30, the estimation processing control unit 68 stores the air resistance coefficient K1 in the storage unit 52 in Step S32 and ends this processing.

Here, in a case where the acceleration Gx and the vehicle speed Vx are in a predetermined range, and there is a non-braking state, as in the flowchart illustrated in FIG. 5, the estimation processing control unit 68 estimates the vehicle weight M1. In other words, the estimation processing control unit 68 sets the traveling condition for estimating the vehicle weight M1 to include the non-braking state in addition to the range of the acceleration Gx and the vehicle speed Vx. The estimation processing control unit 68 may set the traveling condition for estimating the road load RL1 to include the non-braking state in addition to the range of the acceleration Gx and the vehicle speed Vx. In other words, the estimation processing control unit 68 may be configured to estimate the road load RL1 in a case where the acceleration Gx and the vehicle speed Vx are in a predetermined range, and there is the non-braking state.

Next, the estimation processing control unit 68 of the deceleration factor estimating device 1 changes the values of the first threshold values of the acceleration and the vehicle speed described above depending on whether or not the estimated value of the vehicle weight converges and whether or not the estimated value of the air resistance coefficient converges. Hereinafter, the processing of setting the first threshold values of the acceleration and the speed will be described.

Figure 6:
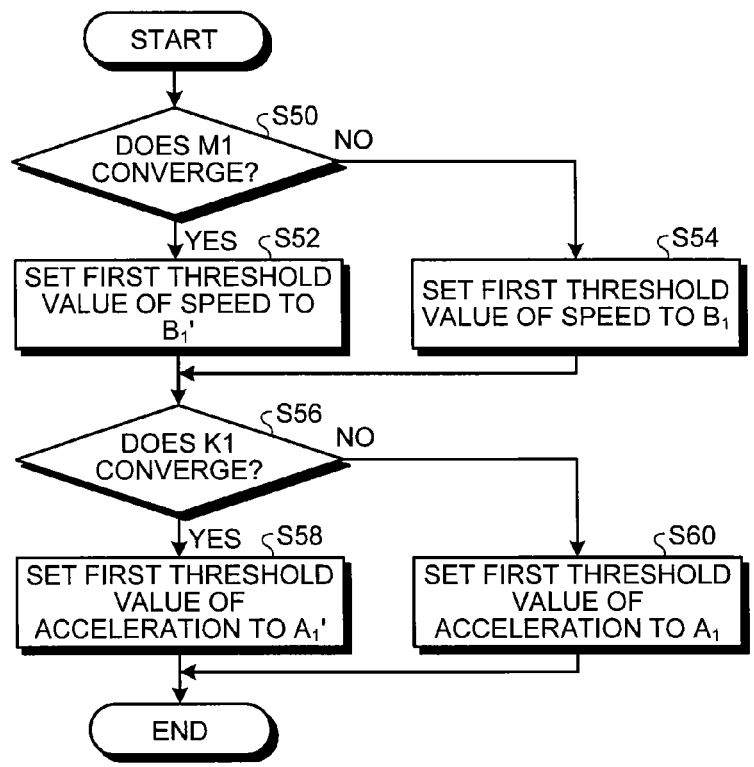
FIG. 6 is a flowchart that illustrates an example of control by the ECU.

FIG. 6 is a flowchart that illustrates an example of control by the ECU. Hereinafter, the processing of setting the first threshold values of the acceleration and the speed will be described with reference to FIG. 6. The estimation processing control unit 68 determines in Step S50 whether or not the M1 converges, in other words, whether or not the vehicle weight M1 that is an estimated value converges. For example, in a case where the amount of change of the vehicle weight M1, which is an estimated value, per unit time is a threshold value or less, the estimation processing control unit 68 determines that the vehicle weight M1 converges, and in a case where the amount of change of the vehicle weight M1, which is an estimated value, per unit time is more than the threshold value, the estimation processing control unit 68 determines that the vehicle weight M1 does not converge. Note that the criterion for the determination of the convergence of the vehicle weight M1 is not limited thereto, and various criteria used for the determination of the convergence of a calculated value may be used.

In a case where the vehicle weight M1 is determined to converge (Yes) in Step S50, the estimation processing control unit 68 sets the first threshold value of the speed to a speed $B_1'$ in Step S52, and the processing proceeds to Step S56. In a case where the vehicle weight M1 is determined not to converge (No) in Step S50, the estimation processing control unit 68 sets the first threshold value of the speed to the speed $B_1$ in Step S54, and the processing proceeds to Step S56. Here, the speed $B_1'$ is higher than the speed $B_1$. In other words, in a case where the vehicle weight M1 is determined to converge, the estimation processing control unit 68 sets the first threshold value of the speed to a speed higher than that of a case where the vehicle weight does not converge.

When the first threshold value of the speed is determined in Step S52 or Step S54, the estimation processing control unit 68 determines in Step S56 whether or not K1 converges, in other words, whether or not the air resistance coefficient K1 that is an estimated value converges. For example, in a case where the amount of change of the air resistance coefficient K1, which is an estimated value, per unit time is a threshold value or less, the estimation processing control unit 68 determines that the air resistance coefficient K1 converges, and in a case where the amount of change of the air resistance coefficient K1, which is an estimated value, per unit time is more than the threshold value, the estimation processing control unit 68 determines that the air resistance coefficient K1 does not converge. Note that the criterion for the determination of the convergence of the air resistance coefficient K1 is not limited thereto, and various criteria used for the determination of the convergence of a calculated value may be used.

In a case where the air resistance coefficient K1 is determined to converge (Yes) in Step S56, the estimation processing control unit 68 sets the first threshold value of the acceleration to acceleration $A_1'$ in Step S58 and ends this processing. In a case where the air resistance coefficient K1 is determined not to converge (No) in Step S56, the estimation processing control unit 68 sets the first threshold value of the acceleration to the speed $A_1$ in Step S60 and ends this processing. Here, the acceleration $A_1'$ is higher than the acceleration $A_1$. In other words, in a case where the air resistance coefficient K1 is determined to converge, the estimation processing control unit 68 sets the first threshold value of the acceleration to acceleration higher than that of a case where the air resistance coefficient does not converge.

Figure 7:
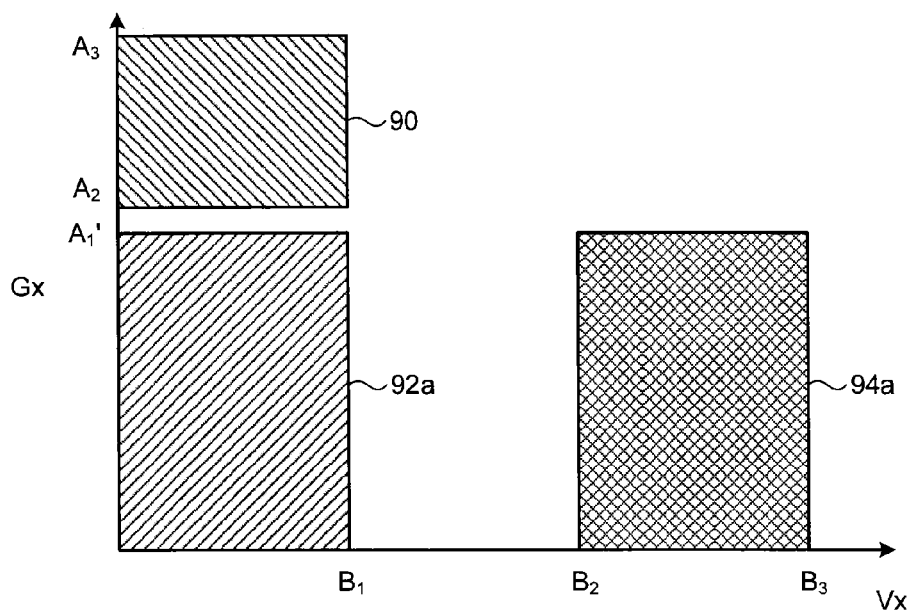
FIG. 7 is an explanatory diagram that illustrates another relation among the deceleration factor to be estimated, the speed, and the acceleration.
Figure 8:
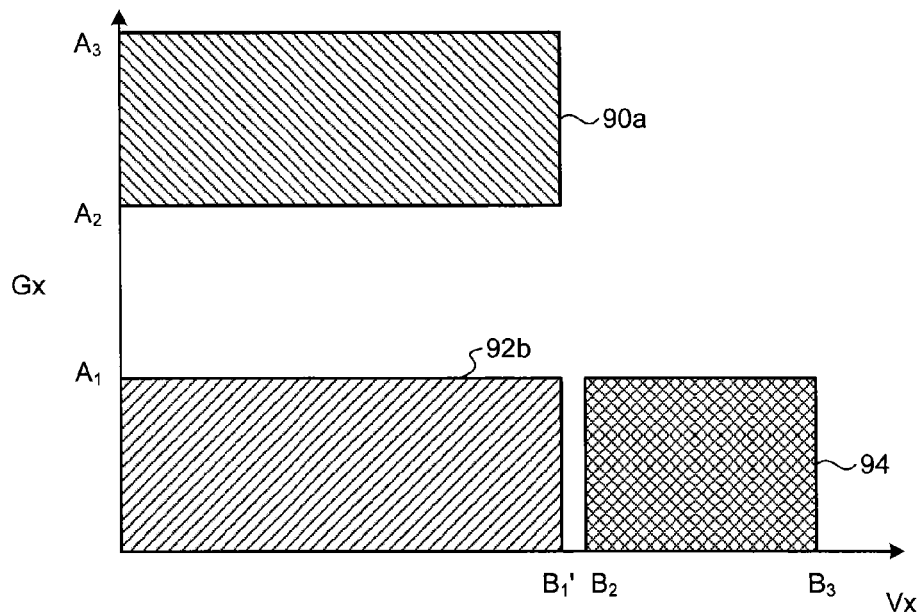
FIG. 8 is an explanatory diagram that illustrates another relation among the deceleration factor to be estimated, the speed, and the acceleration.
Figure 9:
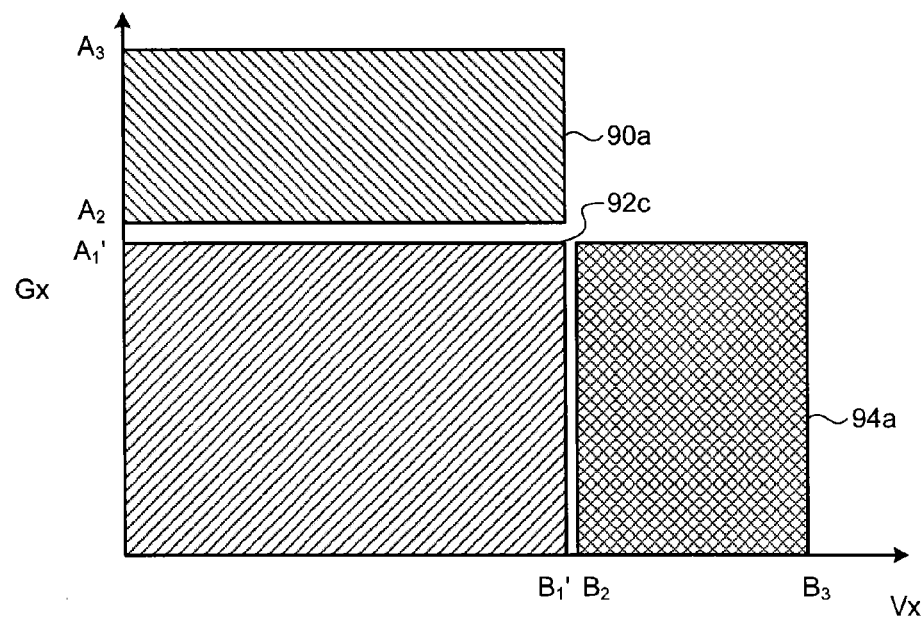
FIG. 9 is an explanatory diagram that illustrates another relation among the deceleration factor to be estimated, the speed, and the acceleration.

Here, FIGS. 7 to 9 are explanatory diagrams that respectively illustrate other relations among the deceleration factor to be estimated, the speed, and the acceleration. By setting the first threshold value of the acceleration and the first threshold value of the speed in the processing in FIG. 6, the estimation processing control unit 68 can change the range of the traveling condition for estimating each deceleration factor depending on whether or not the deceleration factor converges.

In a case where the vehicle weight M1 does not converge (unconverged), and the air resistance coefficient K1 does not converge (unconverged), the estimation processing control unit 68 sets the first threshold value of the acceleration to the acceleration $A_1$ and sets the first threshold value of the speed to the speed $B_1$. In this case, as illustrated in FIG. 4 described above, the estimation processing control unit 68 estimates the vehicle weight M1 with the traveling condition of the area 90, estimates the road load RL1 with the traveling condition of the area 92, and estimates the air resistance coefficient K1 with the traveling condition of the area 94.

Next, in a case where the vehicle weight M1 converges, and the air resistance coefficient K1 does not converge (unconverged), the estimation processing control unit 68 sets the first threshold value of the acceleration to the acceleration $A_1'$ and sets the first threshold value of the speed to the speed $B_1$. In this case, as illustrated in FIG. 7, the estimation processing control unit 68 estimates the vehicle weight M1 with the traveling condition of the area 90, estimates the road load RL1 with the traveling condition of an area 92a, and estimates the air resistance coefficient K1 with the traveling condition of an area 94a. Here, the acceleration $A_1'$ is higher than the acceleration $A_1$ and is lower than the acceleration $A_2$. Accordingly, in the areas 92a and 94a, the upper limits of the acceleration of the traveling conditions are respectively higher than those of the areas 92 and 94. Accordingly, in a case where the vehicle weight M1 converges, the estimation processing control unit 68 estimates the road load RL1 and the air resistance coefficient K1 at the acceleration higher than that of a case where the vehicle weight M1 does not converge. In the case where the vehicle weight M1 converges, an error in the vehicle weight M1 decreases. Accordingly, in the case of high acceleration, even when the road load RL1 and the air resistance coefficient K1 are estimated, the deceleration factor estimating device 1 can estimate the road load RL1 and the air resistance coefficient K1 while maintaining high accuracy.

Next, in a case where the vehicle weight M1 does not converge (unconverged), and the air resistance coefficient K1 converges, the estimation processing control unit 68 sets the first threshold value of the acceleration to the acceleration $A_1$ and sets the first threshold value of the speed to the speed $B_1'$. In this case, as illustrated in FIG. 8, the estimation processing control unit 68 estimates the vehicle weight M1 with the traveling condition of an area 90a, estimates the road load RL1 with the traveling condition of an area 92b, and estimates the air resistance coefficient K1 with the traveling condition of the area 94. Here, the speed $B_1'$ is higher than the speed $B_1$ and is lower than the speed $B_2$. Accordingly, in the areas 90a and 92b, the upper limits of the speeds of the traveling conditions are respectively higher than those of the areas 90 and 92. Accordingly, in a case where the air resistance coefficient K1 converges, the estimation processing control unit 68 estimates the vehicle weight M1 and the road load RL1 at a speed higher than that of a case where the air resistance coefficient K1 does not converge. In the case where the air resistance coefficient K1 converges, an error in the air resistance coefficient K1 decreases. Accordingly, in the case of a high speed, even when the vehicle weight M1 and the road load RL1 are estimated, the deceleration factor estimating device 1 can estimate the vehicle weight M1 and the road load RL1 while maintaining high accuracy.

Next, in a case where the vehicle weight M1 converges, and the air resistance coefficient K1 converges, the estimation processing control unit 68 sets the first threshold value of the acceleration to the acceleration $A_1'$ and sets the first threshold value of the speed to the speed $B_1'$. In this case, as illustrated in FIG. 9, the estimation processing control unit 68 estimates the vehicle weight M1 with the traveling condition of the area 90a, estimates the road load RL1 with the traveling condition of an area 92c, and estimates the air resistance coefficient K1 with the traveling condition of the area 94a. The area 90a is the same as the area 90a in FIG. 8. The area 94a is the same as the area 94a in FIG. 7. In the area 92c, the upper limit of the acceleration is higher than that of the area 92, and the upper limit of the speed is higher than that of the area 92. Accordingly, in the case where the vehicle weight M1 converges, and the air resistance coefficient K1 converges, the estimation processing control unit 68 estimates the road load RL1 and the air resistance coefficient K1 also at acceleration higher than that of a case where the vehicle weight M1 does not converge. In the case where the vehicle weight M1 converges, and the air resistance coefficient K1 converges, the estimation processing control unit 68 estimates the vehicle weight M1 and the road load RL1 also at a speed higher than that of a case where the air resistance coefficient K1 does not converge. Accordingly, in the case where the vehicle weight M1 converges, and the air resistance coefficient K1 converges, the estimation processing control unit 68 can estimate the road load RL1 with a traveling condition wider than those of any of the cases in FIGS. 4, 7, and 8. In the case where the vehicle weight M1 converges, and the air resistance coefficient K1 converges, errors in the vehicle weight M1 and the air resistance coefficient K1 decrease. Accordingly, even when the road load RL1 is estimated in the case of high acceleration and a high speed, the deceleration factor estimating device 1 can estimate the road load RL1 while maintaining high accuracy.

As described above, the deceleration factor estimating device 1 changes the traveling condition for estimating a second deceleration factor (the air resistance coefficient K1 and the road load RL1 in the case of the vehicle weight M1, and the vehicle weight M1 and the road load RL1 in the case of the air resistance coefficient K1) depending on whether or not a first deceleration factor (for example, the vehicle weight M1 or the air resistance coefficient K1) converges. More specifically, in a case where the first deceleration factor converges, the deceleration factor estimating device 1 executes estimation with a traveling condition (enlarged traveling condition) wider than that of a case where the first deceleration factor does not converge. Accordingly, after the first deceleration factor converges, the deceleration factor estimating device 1 can have many chances for executing the processing of estimating the second deceleration factor, and the second deceleration factor can be caused to converge in a shorter time. In other words, the deceleration factor estimating device 1 can identify the values of the deceleration factors of the vehicle in a shorter time. In addition, in a case where the first deceleration factor converges, by increasing the chance for executing the processing of estimating the second deceleration factor, the deceleration factor estimating device 1 can execute the processing of estimating the second deceleration factor in a state in which an error due to the first deceleration factor is small. Accordingly, the deceleration factor estimating device 1 can decrease the error at the time of the estimation while increasing the change for executing the processing of estimating the second deceleration factor. Therefore, the deceleration factor estimating device 1 can estimate the second deceleration factor with high accuracy in a short time.

As in this embodiment, in a case where the first deceleration factor is set as the vehicle weight M1, the deceleration factor estimating device 1 sets the second deceleration factors as the air resistance coefficient K1 and the road load RL1, and changes the first threshold value of the speed as the traveling condition for performing the estimation. As in this embodiment, in a case where the first deceleration factor is set as the air resistance coefficient K1, the deceleration factor estimating device 1 sets the second deceleration factors as the vehicle weight M1 and the road load RL1 and changes the first threshold value of the acceleration as the traveling condition for performing the estimation. Accordingly, also by changing the first threshold value, the occurrence of an error can be suppressed, whereby the second deceleration factors can be estimated with high accuracy in a short time.

The deceleration factor estimating device 1 may be configured to execute either a combination of Steps S50, S52, and S54 or a combination of Steps S56, S58, and S60 in the flowchart illustrated in FIG. 6.

While in a case where the first deceleration factor is set as the vehicle weight M1, the deceleration factor estimating device 1 of the above-described embodiment has been described to set the air resistance coefficient K1 and the road load RL1 as two second deceleration factors, only any one of them may be set as the second deceleration factor. While in a case where the first deceleration factor is set as the air resistance coefficient K1, the deceleration factor estimating device 1 of the above-described embodiment has been described to set the vehicle weight M1 and the road load RL1 as two second deceleration factors, only any one of them may be set as the second deceleration factor.

In addition, the deceleration factor estimating device 1 determines a deceleration factor to be estimated based on the vehicle speed Vx and the acceleration Gx. In other words, the deceleration factor estimating device 1 estimates a deceleration factor included in the range set in the traveling condition among target deceleration factors to be estimated. Accordingly, each of the vehicle weight M1, the air resistance coefficient K1, and the road load RL1 that are estimation targets can be calculated in the state in which the influence of the other deceleration factors is small, and each of the deceleration factors can be calculated with higher accuracy. When the vehicle weight M1, the air resistance coefficient K1, and the road load RL1 that are the estimation targets are estimated, even in a case where an error is included in the other deceleration factors, the deceleration factor estimating device 1 can decrease the influence thereof. Accordingly, the possibility of inclusion of an error due to the influence of the other deceleration factors at the time of estimating the deceleration factor can be reduced.

In addition, by switching the deceleration factors to be estimated based on the vehicle speed Vx and the acceleration Gx, the deceleration factor estimating device 1 can suppress the inclusion of a value calculated in a state in which the influence of the other deceleration factors is large in the estimated values of the vehicle weight M1, the air resistance coefficient K1, and the road load RL1. This also can reduce the possibility of inclusion of an error due to the influence of the other deceleration factors at the time of estimating the deceleration factor, and can increase the accuracy of the estimation of the deceleration factor.

The estimation processing control unit 68 of the deceleration factor estimating device 1 may be configured to stop the estimation of all the parameters, in other words, prohibit the processing of estimating the deceleration factors in a case where the vehicle behavior stability control is in operation. In addition, in a case where the estimated vehicle weight M1 is determined to be abnormal, it is preferable that the estimation processing control unit 68 of the deceleration factor estimating device 1 stop the estimation of the air resistance coefficient K1 and the road load RL1.

Here, in a case where the estimation of the deceleration factor is executed, it is preferable that the deceleration factor estimating device 1 calculate a corrected estimated value of the calculated estimated value with a past estimated value being taken into account. In addition, it is preferable that the deceleration factor estimating device 1 use the corrected estimated value as the value of a deceleration factor at the time of being used by another device such as the drive assisting control unit 53. For example, it is preferable that the corrected estimated value of the vehicle weight M1 be calculated by using Expression 5 described below.

$$M1\_F = (1-kk) \cdot M1_{n-1} + kk \cdot M1_n \quad \text{(Expression 5)}$$

M1_F is a corrected estimated value, $M1_{n-1}$ is a previous estimated value, and $M1_n$ is a current estimated value. In addition, kk is a weighting factor. Note that in a case where the corrected estimated value M1_F of the vehicle weight M1 is calculated, it is preferable that a filter having a filter time constant of a short period be used. For example, it is preferable to use a filter time constant having a period of 60 s.

Figure 10:
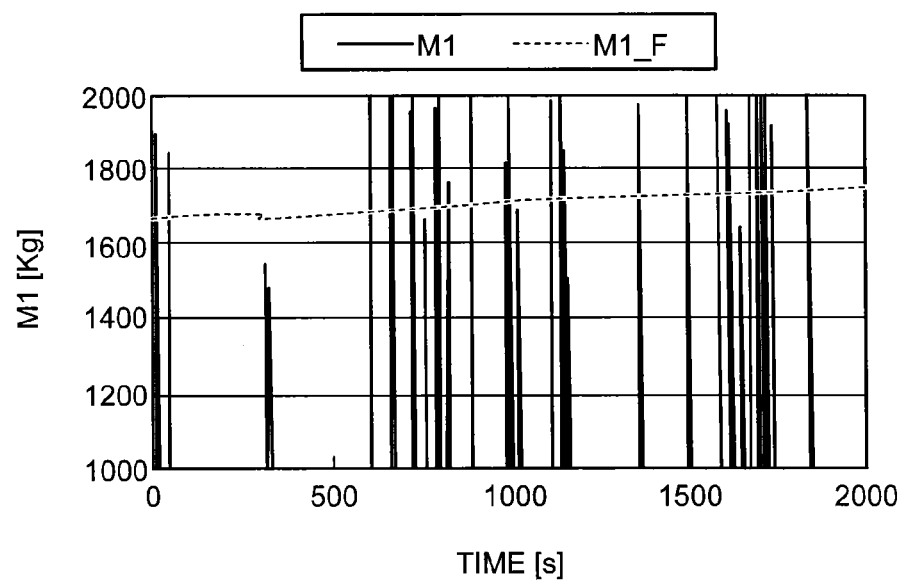
FIG. 10 is an explanatory diagram that illustrates a relation between a calculation result of the vehicle weight and time.

FIG. 10 illustrates a relation between the calculated M1 and M1_F. In FIG. 10, the vertical axis is the vehicle weight, and the horizontal axis is time. FIG. 10 is an explanatory diagram that illustrates a relation between a calculation result of the vehicle weight and time. Note that the example illustrated in FIG. 10 is an example of a case where M1 is set to 1800 kg. As illustrated in FIG. 10, by calculating the corrected estimated value M1_F acquired by correcting the current estimated value using the previous estimated value, the deceleration factor estimating device 1 can calculate the estimated value having higher accuracy.

Next, it is preferable that a corrected estimated value K1_F of the air resistance coefficient K1 be calculated by using Expression 6 described below.

$$K1\_F = (1-kk) \cdot K1_{n-1} + kk \cdot K1_n \quad \text{(Expression 6)}$$

K1_F is a corrected estimated value, $K1_{n-1}$ is a previous estimated value, and $K1_n$ is a current estimated value. In addition, kk is a weighting factor. Note that in a case where the corrected estimated value K1_F of the air resistance coefficient K1 is calculated, it is preferable that a filter having a filter time constant of a long period be used. For example, it is preferable to use a filter time constant having a period of 600 s.

Figure 11:
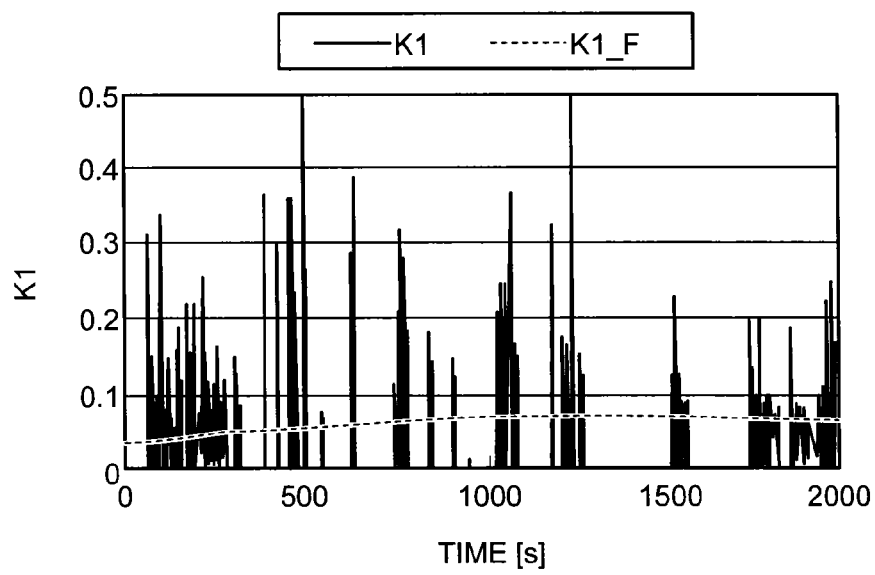
FIG. 11 is an explanatory diagram that illustrates a relation between a calculation result of an air resistance coefficient and time.

FIG. 11 illustrates a relation between the calculated K1 and K1_F. In FIG. 11, the vertical axis is the air resistance coefficient, and the horizontal axis is time. FIG. 11 is an explanatory diagram that illustrates a relation between a calculation result of the air resistance coefficient and time. As illustrated in FIG. 11, by calculating the corrected estimated value K1_F acquired by correcting the current estimated value using the previous estimated value, the deceleration factor estimating device 1 can calculate the estimated value having higher accuracy.

Next, it is preferable that a corrected estimated value RL1_F of the road load RL1 be calculated by using Expression 7 described below.

$$RL1\_F = (1-kk) \cdot RL1_{n-1} + kk \cdot RL1_n \quad \text{(Expression 7)}$$

RL1_F is a corrected estimated value, $RL1_{n-1}$ is a previous estimated value, and $RL1_n$ is a current estimated value. In addition, kk is a weighting factor. Note that in a case where the corrected estimated value RL1_F of the road load RL1 is calculated, it is preferable that a filter having a filter time constant of a middle period be used. For example, it is preferable to use a filter time constant having a period of 300 s.

Figure 12:
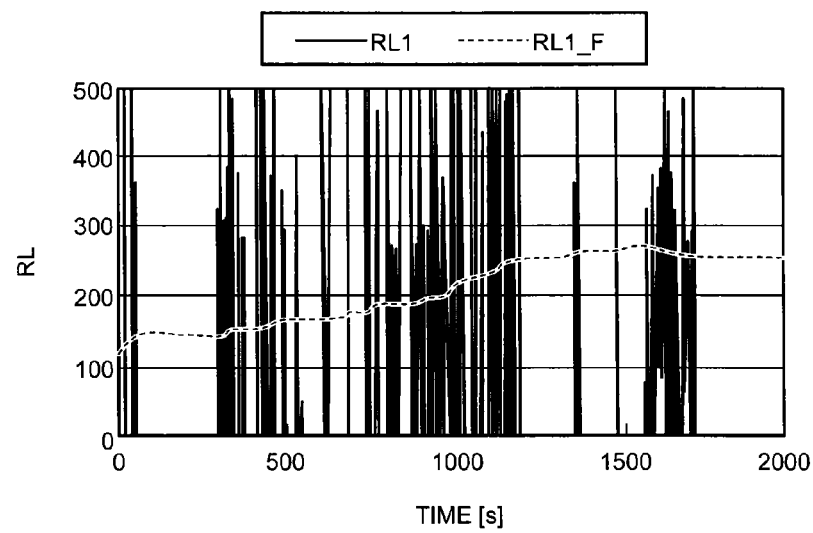
FIG. 12 is an explanatory diagram that illustrates a relation between a calculation result of a road load and time.

FIG. 12 illustrates a relation between the calculated RL1 and RL1_F. In FIG. 12, the vertical axis is the road load, and the horizontal axis is time. FIG. 12 is an explanatory diagram that illustrates a relation between a calculation result of the road load and time. As illustrated in FIG. 12, by calculating the corrected estimated value RL1_F acquired by correcting the current estimated value using the previous estimated value, the deceleration factor estimating device 1 can calculate the estimated value having higher accuracy.

The deceleration factor estimating device 1 corrects the estimated values as illustrated in FIGS. 10 to 12 and Expressions 5 to 7 described above, and thereby can calculate the estimated values having higher accuracy. In addition, when the corrected values are calculated, by using a different filter time constant for each deceleration factor, the estimated values having higher accuracy can be calculated.

In a case where the estimated value of the vehicle weight is corrected, by performing filtering processing using a filter having a short period, the deceleration factor estimating device 1 can make a correction corresponding to a variation factor of the vehicle weight. More specifically, the correction can be made in correspondence with variation occurring for a short period of time such as the number of passengers and the movement of loaded baggage.

In a case where the estimated value of the air resistance coefficient is corrected, by performing filtering processing using a filter having a long period, the deceleration factor estimating device 1 can make a correction corresponding to a variation factor of the air resistance coefficient. More specifically, the correction can be made in correspondence with variation occurring for a long period of time, in other words, variation having no large movement for a long period of time once the change is made such as the replacement of vehicle exterior equipment such as an aero part.

Figure 13:
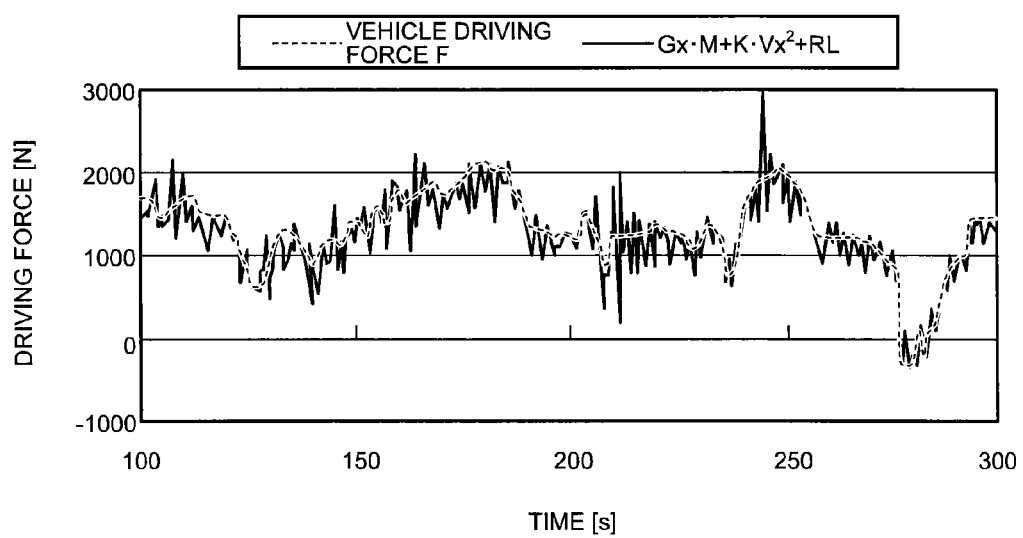
FIG. 13 is an explanatory diagram that illustrates a relation between a calculation result of a driving force and time.

Next, a case will be described in which a driving force is calculated by using an equation of motion with the above-described deceleration factors being taken into account. FIG. 13 is an explanatory diagram that illustrates a relation between a calculation result of the driving force and time. In FIG. 13, the vertical axis is the driving force [N], and the horizontal axis is time [s]. In addition, FIG. 13 illustrates a driving force (vehicle driving force) F calculated through measurement and a driving force ($Gx \cdot M + K \cdot Vx^2 + RL$) calculated by substituting values into the right side of Expression 1. Here, $Gx \cdot M + K \cdot Vx^2 + RL$ illustrated in FIG. 13 has been calculated by using M as a standard vehicle weight, K as a standard air resistance coefficient, RL as a standard road load, Gx as a detection value of the acceleration sensor 11, and V as a detection value of the vehicle speed sensor 10. Here, the standard air resistance coefficient K has been calculated by air density ρ×frontal projected area S×air resistance coefficient cd. In addition, the standard road load RL has been calculated from rolling resistance Rr of the tire and a vehicle mechanical loss Mr. In other words, in FIG. 13, the driving force is calculated in a state in which the deceleration factors are constant, in other words, by using approximately accurate values of the deceleration factors.

As illustrated in FIG. 13, a value close to the actual driving force can be calculated by calculating using the equation using the deceleration factors calculated with high accuracy. Accordingly, since the deceleration factor estimating device 1 of this embodiment can estimate the deceleration factors with high accuracy, the driving force close to the actual value can be calculated. Since the deceleration factor estimating device 1 can increase the accuracy of the term of the deceleration factors of Expression 1 described above, the relation among the driving force, the acceleration, and the speed at the time of traveling can be accurately calculated. Accordingly, also in a case where the traveling behavior of the vehicle is predicted at the time of drive assistance, the traveling behavior can be accurately predicted. Since the vehicle behavior can be accurately predicted, more appropriate drive assistance can be executed.

Here, in a case where the detection value of the acceleration sensor 11 is used, it is preferable that the deceleration factor estimating device 1 use a value acquired by correcting the detection value using a low pass filter, as the acceleration. In other words, it is preferable that acceleration GxF corrected using Expression 8 described below be used.

$$GxF = (1-kk) \cdot Gx_{n-1} + kk \cdot Gx_n \quad \text{(Expression 8)}$$

Figure 14:
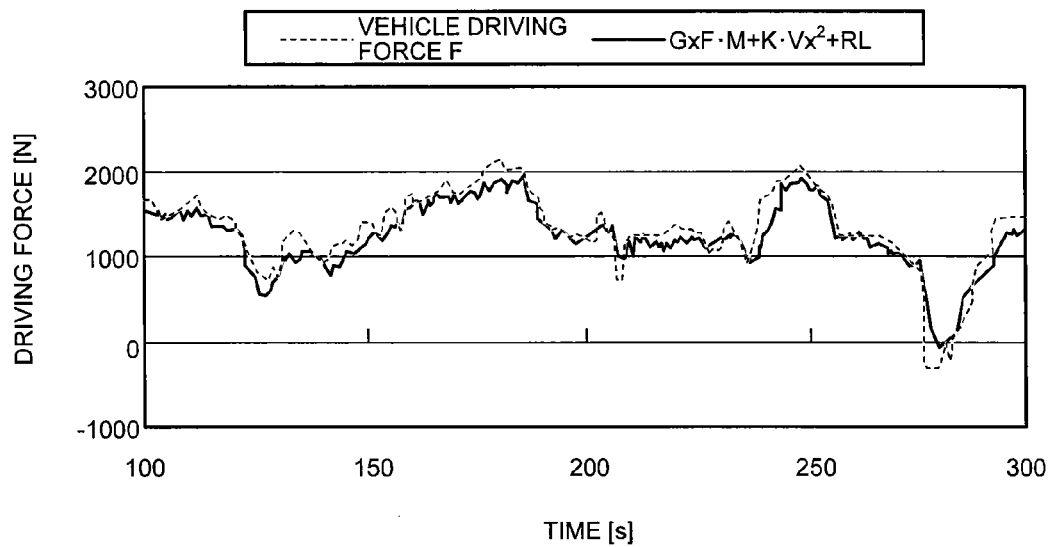
FIG. 14 is an explanatory diagram that illustrates a relation between a calculation result of a driving force and time.

Here, FIG. 14 is an explanatory diagram that illustrates a relation between a calculation result of the driving force and time. In FIG. 14, the vertical axis is the driving force [N], and the horizontal axis is time [s]. In addition, FIG. 14 illustrates a driving force (vehicle driving force) F calculated through measurement and a driving force ($GxF \cdot M + K \cdot Vx^2 + RL$) calculated by substituting values into the right side of Expression 1. In other words, in FIG. 14, as the acceleration of the driving force calculated by substituting values into the right side of Expression 1, a value acquired by eliminating a high-frequency component using a low pass filter is used. As illustrated in FIG. 14, by using the value acquired by eliminating the high-frequency component as the acceleration, the deceleration factor estimating device 1 can estimate deceleration factors using the value from which the noise component is eliminated. Accordingly, the accuracy of the estimation of the deceleration factors can be made higher.

Here, by changing the range of the traveling condition for executing the processing of estimating the second deceleration factors depending on whether or not the first deceleration factor converges, the deceleration factor estimating device 1 of the above-described embodiment can estimate the second deceleration factors with high accuracy in a shorter time. However, the configuration is not limited thereto. The deceleration factor estimating device 1 may not change the range of the traveling condition for executing the processing of estimating the deceleration factors from a fixed value, in other words, a value set in advance.

Figure 15:
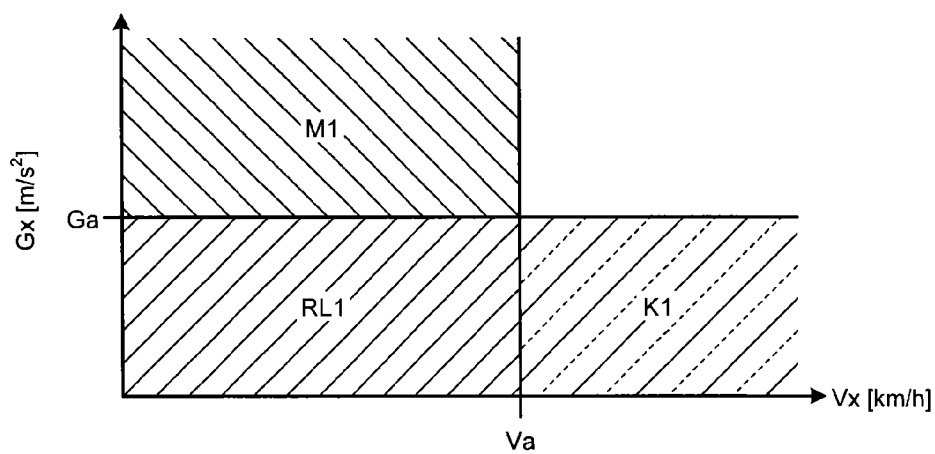
FIG. 15 is an explanatory diagram that illustrates a relation among a deceleration factor to be estimated, a speed, and acceleration.

FIG. 15 is an explanatory diagram that illustrates a relation among a deceleration factor to be estimated, a speed, and acceleration. Here, in FIG. 15, the vertical axis is the acceleration Gx [m/s$^2$], and the horizontal axis is the vehicle speed Vx [km/h]. In addition, acceleration Ga and a vehicle speed Va are threshold values. For example, the acceleration Ga may be set to 1.0, and the vehicle speed Va may be set to 50.0. The estimation processing control unit 68 may determines a deceleration factor to be estimated by using the acceleration Ga and the vehicle speed Va as the threshold values.

In a case where the relation illustrated in FIG. 15 is used, in a case where the acceleration Gx is more than Ga, and the vehicle speed Vx is less than Va, the estimation processing control unit 68 estimates the vehicle weight M1 among the deceleration factors. In a case where the acceleration Gx is less than Ga, and the vehicle speed Vx is more than Va, the estimation processing control unit 68 estimates the air resistance coefficient K1 among the deceleration factors. In a case where the acceleration Gx is less than Ga, and the vehicle speed Vx is less than Va, the estimation processing control unit 68 estimates the road load RL1 among the deceleration factors. In a case where the traveling condition for estimating the deceleration factor is fixed, as illustrated in FIG. 15, the deceleration factor estimating device 1 sets the acceleration Ga and the vehicle speed Va that are threshold values as boundaries, in other words, sets the first and second threshold values to have the same value, whereby the chance for estimating each deceleration factor can be increased further.

Figure 16:
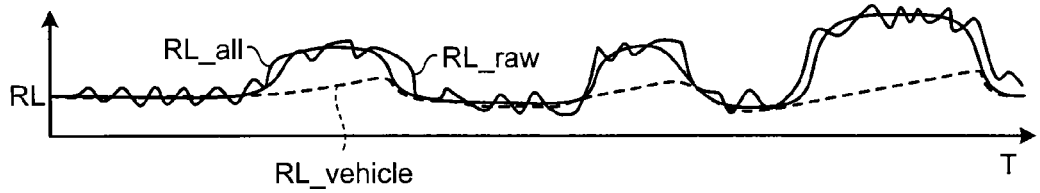
FIG. 16 is an explanatory diagram that illustrates a calculation result of a road load.
Figure 17:
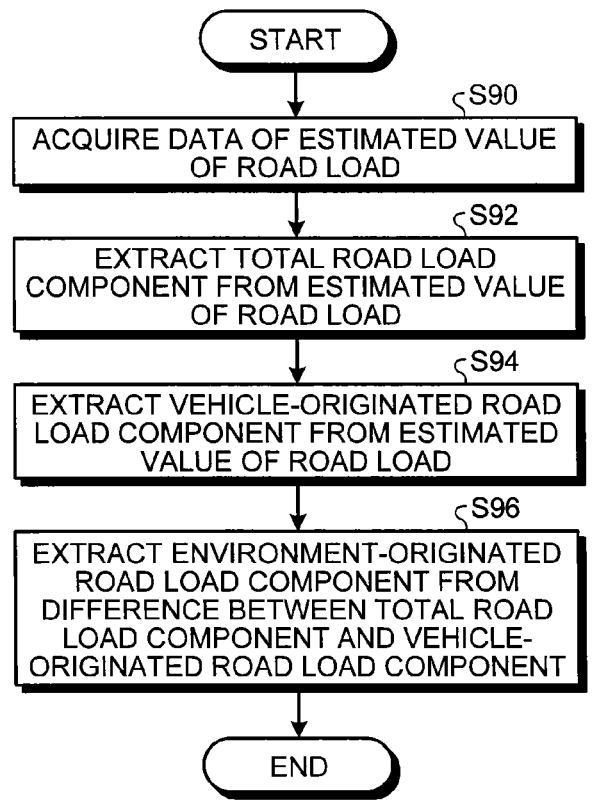
FIG. 17 is a flowchart that illustrates an example of control by the ECU.

Next, the processing of the filtering calculating unit 67 will be described with reference to FIGS. 16 and 17. FIG. 16 is an explanatory diagram that illustrates a calculation result of the road load. FIG. 17 is a flowchart that illustrates an example of control by the ECU. Here, in FIG. 16, the vertical axis is the calculated value (RL) of the road load, and the horizontal axis is time (T).

As described above, the filtering calculating unit 67 is supplied with data of an estimated value (RL_raw) of the road load, for example, as a signal from the road load calculating unit 65. The filtering calculating unit 67 extracts a vehicle-originated road load component (RL_vehicle) and an environment-originated road load component (RL_env) from the estimated value of the road load by calculating the data of the estimated value (RL_raw) of the road load that is calculated by the road load calculating unit 65. More specifically, the filtering calculating unit 67 extracts (calculates) a total road load component (RL_all) and the vehicle-originated road load component (RL_vehicle) from the estimated value (RL_raw) of the road load in filtering processing. The environment-originated RL calculating unit 67 extracts the environment-originated road load component (RL_env) based on the total road load component (RL_all) and the vehicle-originated road load component (RL_vehicle) that are calculated. Here, the total road load component (RL_all) is a current road load component that includes both the vehicle-originated component and the environment-originated component of the vehicle.

In FIG. 16, the total road load component (RL_all) and the vehicle-originated road load component (RL_vehicle) calculated by the filtering calculating unit 67 are illustrated. In addition, in FIG. 16, the estimated value (RL_raw) of the road load that is calculated by the road load calculating unit 65 is illustrated as well.

Here, an example of the processing executed by the filtering calculating unit 67 of the ECU 50 will be described with reference to FIG. 17. In Step S90, the filtering calculating unit 67 acquires data of an estimated value of the road load. When the data of the estimated value of the road load is acquired in Step S90, the filtering calculating unit 67 extracts a total road load component from the estimated value of the road load in Step S92. More specifically, the filtering calculating unit 67 calculates the total road load component (RL_all) by performing filtering processing on the estimated value (RL_raw) of the road load using a filter having a first time constant. Here, the filter having the first time constant is a fast filter. As the first time constant, for example, 10 s may be used. By performing filtering using the fast filter having the first time constant that is a short time constant, the filtering calculating unit 67 can favorably calculate the total road load component (RL_all) that includes both the vehicle-originated road load component and the environment-originated road load component of the vehicle 2. By performing filtering using the fast filter having the first time constant that is a short time constant, the deceleration factor estimating device 1 can favorably calculate the current road load component applied to the vehicle 2. By performing the filtering processing using the filter having the first time constant, as illustrated in FIG. 16, the filtering calculating unit 67 can extract the total road load component of the current state in a state in which a noise is appropriately eliminated. Note that the total road load component has the same value as the estimated value of the road load that is calculated using Expression 7 described above. Each unit of the vehicle 2 can use the total road load component as an estimated value of the road load for various kinds of calculation.

When the total road load component is extracted in Step S92, the filtering calculating unit 67 extracts a vehicle-originated road load component from the estimated value of the road load in Step S94. More specifically, by performing filtering processing on the estimated value (RL_raw) of the road load using a filter having the first time constant, the filtering calculating unit 67 calculates the total road load component (RL_all). More specifically, by performing filtering processing on the estimated value (RL_raw) of the road load using a filter having a second time constant, the filtering calculating unit 67 extracts the vehicle-originated road load component (RL_vehicle). Here, the filter having the second time constant is a slow filter. As the second time constant, for example, 100 s may be used. By performing filtering using the slow filter having the second time constant that is a long time constant, the filtering calculating unit 67 can favorably calculate the vehicle-originated road load component (RL_vehicle) of the vehicle 2. In other words, by performing filtering using the slow filter having the second time constant that is a long time constant, the deceleration factor estimating device 1 can favorably extract the vehicle-originated road load component (RL_vehicle) including the tire pressure, the tire type, the brake drug, the vehicle mechanical resistance, and the like that cannot easily change during traveling. By performing the filtering processing using the filter having the second time constant, as illustrated in FIG. 16, the filtering calculating unit 67 can extract the vehicle-originated road load component (RL_vehicle) that is a road load component which cannot easily change in the estimated value RL_raw of the road load. Here, the order of the processing of Step S92 and the processing of Step S94 may be reversed.

When the vehicle-originated road load component is extracted in Step S94, the filtering calculating unit 67 extracts the environment-originated road load component from a difference between the total road load component and the vehicle-originated road load component in Step S96. More specifically, the environment-originated road load component (RL_env) is calculated using Expression 9 described below. When the environment-originated road load component (RL_env) is calculated in Step S96, the filtering calculating unit 67 ends this processing. Note that the filtering calculating unit 67 may execute the processing in FIG. 17 every time the data of the estimated value of the road load is acquired or when the data of estimated values of the road load for a certain time is accumulated.

$$RL\_env = RL\_all - RL\_vehicle \quad \text{(Expression 9)}$$

By performing the above-described processing using the filtering calculating unit 67, the deceleration factor estimating device 1 can extract the environment-originated road load component from the estimated value of the road load. More specifically, by detecting a difference between the total road load component (RL_all) and the vehicle-originated road load component (RL_vehicle) that are acquired by processing the data of the estimated value of the road load using filters each having a different time constant, the deceleration factor estimating device 1 can eliminate the vehicle-originated road load component (RL_vehicle) from the total road load component that is the current road load component of the vehicle, and can extract the environment-originated road load component (RL_env) changing in a short time. Here, as the environment-originated road load component that can easily change, there is a road load component due to a traveling road surface, for example whether or not the vehicle is traveling in a puddle, whether or not the vehicle is traveling in a rainfall state, whether or not the vehicle is traveling in a snowy state, and whether the vehicle is traveling on a rough road surface or on a developed road surface.

The deceleration factor estimating device 1 can extract the environment-originated road load component, and thus can execute various kinds of control according to the environment-originated road load component. Accordingly, the deceleration factor estimating device 1 can execute more processing more appropriately.

While it is preferable that the deceleration factor estimating device 1 extract the environment-originated road load component from the estimated value of the road load by performing the above-described processing using the filtering calculating unit 67, the configuration is not limited thereto. The deceleration factor estimating device 1 may perform filtering processing using the filtering calculating unit 67 and extract only the vehicle-originated road load component (RL_vehicle). By extracting a predetermined frequency component from the estimated value of the road load using the filtering calculating unit 67, the deceleration factor estimating device 1 can extract various components of the road load. Accordingly, information of each component of the road load can be acquired, and various kinds of processing can be executed in correspondence with the extracted road load components. In addition, information of each component of the road load can be acquired, and thereby the information of the road load can be acquired in detail and deceleration factors can be analyzed in more detail.

The estimation processing control unit 68 of the deceleration factor estimating device 1 may control the processing of estimating deceleration factors based on the environment-originated RL calculated by the filtering calculating unit 67. More specifically, in a case where the environment-originated RL calculated by the filtering calculating unit 67 is determined to satisfy a set condition, the estimation processing control unit 68 can stop the estimation of the air resistance coefficient K1 and the road load RL1.

Figure 18:
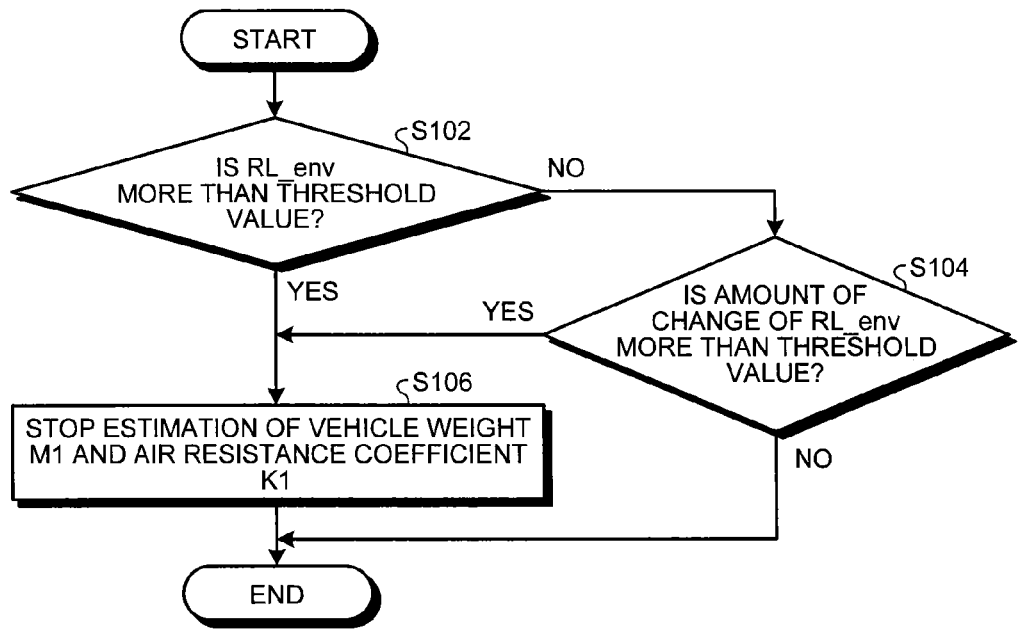
FIG. 18 is a flowchart that illustrates an example of control by the ECU.

FIG. 18 is a flowchart that illustrates an example of control by the ECU. Hereinafter, an example of controlling the processing of estimating deceleration factors based on the environment-originated RL calculated by the filtering calculating unit 67 will be described with reference to FIG. 18.

In Step S102, the estimation processing control unit 68 determines whether or not the environment-originated road load component (RL_env) is more than a threshold value. In a case where the estimation processing control unit 68 determines in Step S102 that the environment-originated road load component (RL_env) is more than the threshold value (Yes), the processing proceeds to Step S106.

In a case where the environment-originated road load component (RL_env) is determined not to be more than the threshold value (No) in Step S102, the estimation processing control unit 68 determines in Step S104 whether or not the amount of change of the environment-originated road load component (RL_env) is more than a threshold value. The amount of change of the environment-originated road load component (RL_env) is an amount of change of the environment-originated road load component (RL_env) for each predetermined time (for example, a unit time). Note that the threshold value in Step S102 and the threshold value in Step S104 are different from each other. In a case where the estimation processing control unit 68 determines in Step S104 that the amount of change of the environment-originated road load component (RL_env) is more than the threshold value (Yes), the processing proceeds to Step S106. In a case where the amount of change of the environment-originated road load component (RL_env) is determined not to be more than the threshold value (No) in Step S104, the estimation processing control unit 68 ends this processing.

In a case where Yes is determined in Step S102 or a case where Yes is determined in Step S104, the estimation processing control unit 68 stops the estimation of the vehicle weight M1 and the air resistance coefficient K1 in Step S106. When the processing of Step S106 is executed, the estimation processing control unit 68 ends this processing.

By performing the processing in FIG. 18, the estimation processing control unit 68 stops the estimation of the vehicle weight M1 and the air resistance coefficient K1 in a case where the environment-originated road load component is more than the threshold value or a case where the amount of change of the environment-originated road load component is more than the threshold value. In other words, even when the traveling condition for estimating the vehicle weight M1 and the air resistance coefficient K1 is formed, the estimation processing control unit 68 does not estimate the deceleration factors.

Accordingly, the estimation processing control unit 68 can control the estimation of the vehicle weight M1 and the air resistance coefficient K1 based on the value of the environment-originated road load component which can easily change in the estimated value of the road load. Therefore, the estimation processing control unit 68 can increase the accuracy of the estimation of the vehicle weight M1 and the air resistance coefficient K1. In addition, by making a determination based on the value of the environment-originated road load component, the estimation processing control unit 68 can control the estimation based on the state of the road surface with accuracy higher than the estimated value of the road load or the total road load component. In other words, by performing control based on the value of the environment-originated road load component, the estimation processing control unit 68 can eliminate the influence of the vehicle-originated road load component, and can control with high accuracy the road load component originated from a factor that can easily change. Note that the control of the estimation of the deceleration factors based on the environment-originated road load component is not limited thereto.

According to the deceleration factor estimating device 1 of the above-described embodiment, by calculating all the three deceleration factors of the vehicle weight, the air resistance coefficient, and the road load through estimation, the deceleration factors can be calculated with higher accuracy. Here, the deceleration factor estimating device 1 is not limited to the calculation of all the three deceleration factors of the vehicle weight, the air resistance coefficient, and the road load through the estimation. The deceleration factor estimating device 1 may be configured to estimate only two deceleration factors among the vehicle weight and the air resistance coefficient and the road load. Note that in a case where the estimation is not performed, a fixed value set in advance or a designed value may be used. By performing switching between determination of performing and not performing an estimation of any of the air resistance coefficient and the road load depending on the traveling state, the deceleration factor estimating device 1 can estimate the deceleration factors with higher accuracy.

While the deceleration factor estimating device 1 has been described to determine whether or not the estimation of each deceleration factor is to be performed, using the acceleration and the speed as the traveling states and as criteria, the criteria for determining whether or not the estimation of each deceleration factor is to be performed is not limited thereto. The deceleration factor estimating device 1 may determine whether or not the estimation of each deceleration factor is to be performed, using any one of the acceleration and the speed as the traveling states and as a criterion. The deceleration factor estimating device 1 may determine whether or not drive assistance is to be performed, using the driving force as the traveling state and as a criterion.

While the deceleration factor estimating device 1 has been described to perform switching between the execution of the estimation of the vehicle weight and the execution of the estimation of the road load, by using one threshold value (acceleration) as a criterion and perform switching between the execution of the estimation of the air resistance coefficient and the execution of the estimation of the road load, by using one threshold value (acceleration) as a criterion, the configuration is not limited thereto. The deceleration factor estimating device 1 may set the threshold value for determining whether or not the estimation of the vehicle weight is to be executed and the threshold value for determining whether or not the estimation of the road load is to be executed, to distinct acceleration. In addition, the deceleration factor estimating device 1 may set the threshold value for determining whether or not the estimation of the air resistance coefficient is to be executed and the threshold value for determining whether or not the estimation of the road load is to be executed, to a distinct speed. Furthermore, for some acceleration, the deceleration factor estimating device 1 may be configured to estimate both the vehicle weight and the road load or may be configured not to estimate any of the vehicle weight and the road load. For some speeds, the deceleration factor estimating device 1 may be configured to estimate both the air resistance coefficient and the road load or may be configured not to estimate any of the air resistance coefficient and the road load.

Since the deceleration factor estimating device 1 can increase the accuracy of the estimation further, as in this embodiment, it is preferable to perform switching between determination of executing and not executing the estimation of one deceleration factor among the three deceleration factors of the vehicle weight, the air resistance coefficient, and the road load in accordance with each traveling state. However, the configuration is not limited thereto. The deceleration factor estimating device 1 may be configured to constantly estimate some of the deceleration factors among the vehicle weight, the air resistance coefficient, and the road load regardless of the traveling state. In such a case, in a case where one deceleration factor is estimated, previous values are used for the other deceleration factors, and calculation of the two is executed separately.

Figure 19:
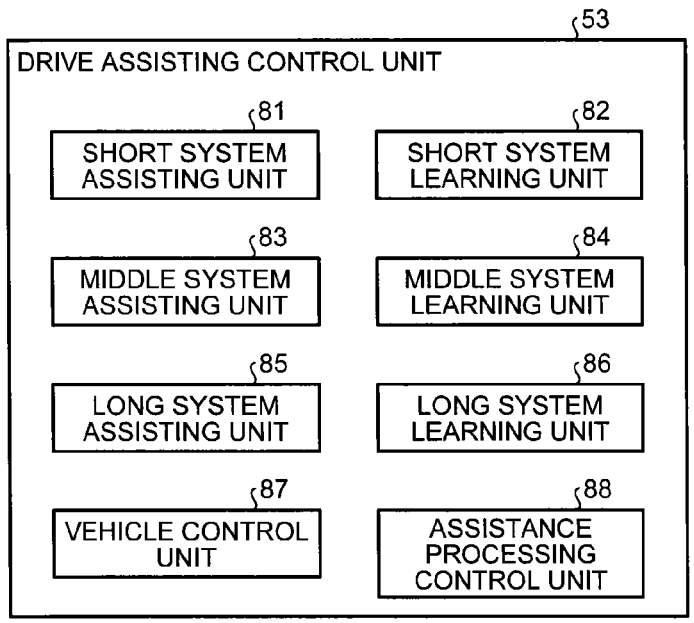
FIG. 19 is a block diagram that illustrates an example of a schematic configuration of a drive assisting control unit.

Next, the drive assisting control unit 53 configuring the drive assisting device 70 will be described with reference to FIGS. 19 to 21. FIG. 19 is a block diagram that illustrates an example of a schematic configuration of the drive assisting control unit. As illustrated in FIG. 19, the drive assisting control unit 53 includes: a short system assisting unit 81; a short system learning unit 82; a middle system assisting unit 83; a middle system learning unit 84; a long system assisting unit 85; a long system learning unit 86; a vehicle control unit 87; and an assistance processing control unit 88.

The short system assisting unit 81 executes drive assistance that is executed in short-distance traveling. The short system assisting unit 81, for example, assists drive at the time of stopping the vehicle at a stop location such as an intersection and a stop line. The short system assisting unit 81 displays timing at which the accelerator is turned off or timing at which the brake is turned on in the HMI device 4, and assists driver's drive. In addition, the short system assisting unit 81 detects the turning-on/off timing of the engine 5, the turning-on/off timing of the MG 6, and the like and controls the operations of the engine 5 and the MG 6.

The short system assisting unit 81 calculates the acceleration (deceleration) Gx of the vehicle, for example, using the deceleration factors estimated by the deceleration factor estimating device 1 and the traveling condition and performs drive assistance. Here, the short system assisting unit 81 of this example estimates the deceleration Gx at the time of turning off the accelerator by using estimated values of the deceleration factors. Here, when a remaining distance up to a target stop location is denoted by $L_{target}$, a target vehicle speed before the target stop location is denoted by $V_{target}$, and the current vehicle speed is denoted by $V_{now}$, the three parameters can be expressed by Expression 10 described below.

$$L_{target} = \frac{V_{now} - V_{target}}{2G_x} \quad \text{(Expression 10)}$$

When $V_{now}$ is detected, and $V_{target}$ is determined, by using the above-described relation, the short system assisting unit 81 can calculate $L_{target}$ by using Gx that is an estimated value and determine timing at which a display recommending turning off the accelerator is made.

The short system learning unit 82 learns information necessary for drive assistance executed in short-distance traveling. The short system learning unit 82, for example, learns information of deceleration stop location necessary for executing drive assistance for stopping the vehicle at the stop location.

The middle system assisting unit 83 executes drive assistance that is executed in middle-distance traveling. The middle system assisting unit 83, for example, estimates the SOC at the time of traveling and assists drive that maintains the SOC in an appropriate range. The middle system assisting unit 83, in order to maintain the SOC in the appropriate range, detects the slop of a route in which traveling is performed from now, estimates a section in which traveling is performed using the engine 5 as the driving source, a section in which traveling is performed using the MG 6 as the driving source, a section in which regeneration is performed using the MG 6 and the SOC is recovered, and the like, and performs switching between traveling using the engine 5 and traveling using the MG 6 based on the estimation.

The middle system assisting unit 83 performs drive assistance, for example, using information of the deceleration factors estimated by the deceleration factor estimating device 1, the traveling condition, and the traveling route. Here, when an estimated SOC change amount is denoted by ΔSOC, a SOC change gain is denoted by a, the gravitational acceleration is denoted by gravity, an elevation is denoted by H, and a distance is denoted by D, such parameters can be expressed by Expression 11 described below, using the deceleration factors and the vehicle speed.

$$\Delta SOC = \alpha \cdot (M \cdot \text{gravity} H - (K \cdot V^2 + RL) \cdot D) \quad \text{(Expression 11)}$$

The middle system assisting unit 83 calculates the estimated SOC change amount at the time of traveling a travelling route by using Expression 11 described above, performs switching between traveling using the engine 5 and traveling using the MG 6 based on a result of the calculation, and thereby can assist the drive that maintains the SOC in an appropriate range.

The middle system learning unit 84 learns information necessary for drive assistance executed in middle-distance traveling. The middle system learning unit 84, for example, learns information of slopes that is necessary for executing drive assistance based on a result of the estimation of the SOC.

The long system assisting unit 85 executes drive assistance that is executed in long-distance traveling. The long system assisting unit 85, for example, estimates power necessary for traveling each section and assists drive capable of efficiently outputting power (traveling power) necessary for the traveling. The long system assisting unit 85 detects traveling power necessary for traveling each section, estimates a section in which traveling is performed using the engine 5 as the driving source, a section in which traveling is performed using the MG 6 as the driving source, and the like, and performs switching between traveling using the engine 5 and traveling using the MG 6 based on the estimation. The long system assisting unit 85, for example, assists drive forming a state in which electric power stored at an arrival point at the destination is efficiently consumed.

The long system assisting unit 85, for example, performs drive assistance by using the vehicle weight M (M1) estimated by the deceleration factor estimating device 1. Here, when the power estimated value of a section n is denoted by power(n), the power stored value of the section n is denoted by $\text{power}_{rec}(n)$, and the vehicle weight at the time of storing the power is denoted by $M_0$, such parameters can be expressed by Expression 12 described below, using the estimated vehicle weight M.

$$\text{power}(n) = \frac{M}{M_0} \cdot \text{power}_{rec}(n) \qquad \text{(Expression 12)}$$

The long system assisting unit 85 calculates an estimated value of traveling power at the time of traveling each section using Expression 12 described above and performs switching between traveling using the engine 5 and traveling using the MG 6 based on a result of the calculation, and thereby the power of the vehicle 2 can be efficiently used.

The long system learning unit 86 learns information necessary for drive assistance executed in long-distance traveling. The long system learning unit 86, for example, learns the above-described power stored value necessary for executing drive assistance based on a result of the estimation of the traveling power of each section and the vehicle weight $M_0$ at the time of storing the power.

The vehicle control unit 87 controls the operations of units including drive units such as the engine 5 and the MG 6 based on the assistance conditions determined by the short system assisting unit 81, the middle system assisting unit 83, the long system assisting unit 85, and the like.

The assistance processing control unit 88 controls the processing of each unit of the drive assisting control unit 53. The assistance processing control unit 88 determines whether or not assistance is to be executed by using the short system assisting unit 81, the middle system assisting unit 83, and the long system assisting unit 85 and causes various kinds of assistance to be executed based on the determination. The assistance processing control unit 88 can cause a plurality of drive assistance to be executed at the same time using the short system assisting unit 81, the middle system assisting unit 83, and the long system assisting unit 85. The assistance processing control unit 88 determines whether or not learning is to be executed using the short system learning unit 82, the middle system learning unit 84, and the long system learning unit 86, and causes various kinds of learning to be executed based on the determination. The assistance processing control unit 88 can cause a plurality of learning to be executed at the same time using the short system learning unit 82, the middle system learning unit 84, and the long system learning unit 86.

The drive assisting device 70 performs drive assistance using deceleration factors estimated by the deceleration factor estimating device 1 by using the short system assisting unit 81, the middle system assisting unit 83, and the long system assisting unit 85 of the drive assisting control unit 53, and thereby can favorably assist the drive. More specifically, by performing drive assistance using the deceleration factors detected with high accuracy, the drive assisting device 70 can further increase the accuracy of the drive assistance.

In addition, the drive assisting device 70 controls the drive assistance and the learning based on the environment factor road load extracted by the environment-originated factor RL calculating unit 67 of the deceleration factor estimating device 1 by using the assistance processing control unit 88, and thereby can further increase the accuracy of the drive assistance.

Figure 20:
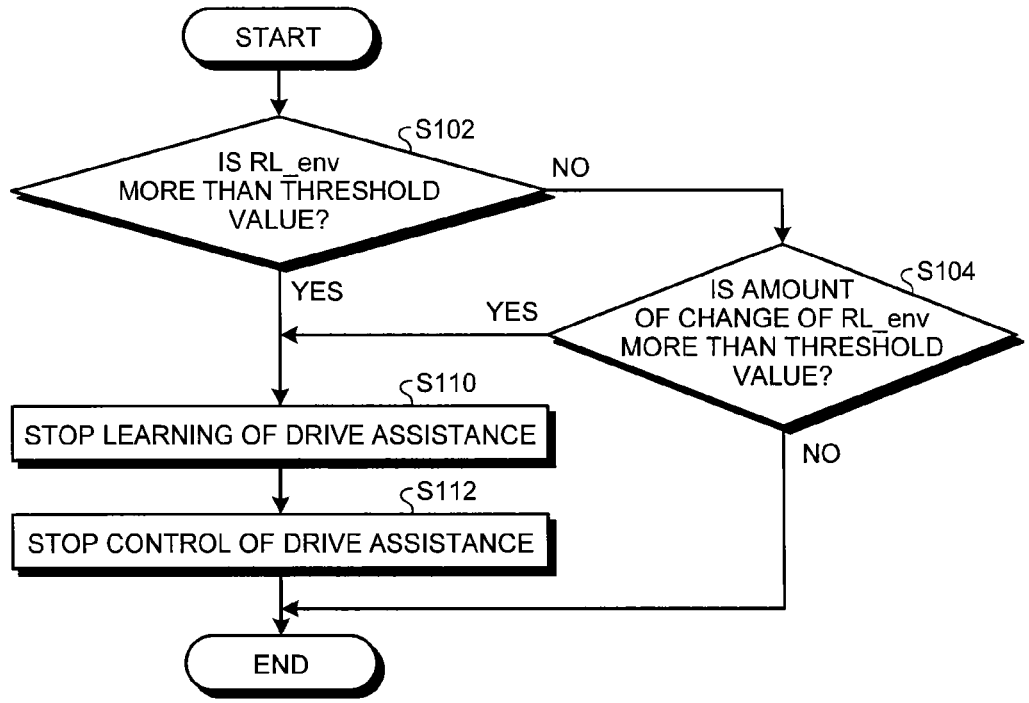
FIG. 20 is a flowchart that illustrates an example of control by the ECU.

FIG. 20 is a flowchart that illustrates an example of control by the ECU. Note that a part of the processing illustrated in FIG. 20 is the same as the processing executed by the estimation processing control unit 68 illustrated in FIG. 18. The same step number is assigned in the same processing, and detailed description thereof will be omitted.

In Step S102, the assistance processing control unit 88 determines whether or not the environment-originated road load component (RL_env) is more than a threshold value. In a case where the assistance processing control unit 88 determines in Step S102 that the environment-originated road load component (RL_env) is more than the threshold value (Yes), the processing proceeds to Step S110.

In a case where the environment-originated road load component (RL_env) is determined not to be more than the threshold value (No) in Step S102, the assistance processing control unit 88 determines in Step S104 whether or not the amount of change of the environment-originated road load component (RL_env) is more than a threshold value. In a case where the assistance processing control unit 88 determines in Step S104 that the amount of change of the environment-originated road load component (RL_env) is more than the threshold value (Yes), the processing proceeds to Step S110. In a case where the amount of change of the environment-originated road load component (RL_env) is determined not to be more than the threshold value (No) in Step S104, the assistance processing control unit 88 ends this processing.

In a case where Yes is determined in Step S102 or a case where Yes is determined in Step S104, the assistance processing control unit 88 stops the learning of the drive assistance in Step S110 and stops the control of the drive assistance in Step S112. When the processing of Step S112 is executed, the assistance processing control unit 88 ends this processing. The stopping of the learning of the drive assistance is stopping the learning executed by the short system learning unit 82, the middle system learning unit 84, and the long system learning unit 86. The stopping of the control of the drive assistance is stopping the drive assistance executed by the short system assisting unit 81, the middle system assisting unit 83, and the long system assisting unit 85.

By performing the processing illustrated in FIG. 20, the assistance processing control unit 88 stops the learning of the drive assistance and the drive assistance itself in a case where the environment-originated road load component is more than the threshold value or a case where the amount of change of the environment-originated road load component is more than the threshold value.

Accordingly, the assistance processing control unit 88 can determine whether or not the learning of the drive assistance and the drive assistance itself are executed based on the value of the environment-originated road load component which can easily change in the estimated value of the road load. In addition, by performing control based on the environment-originated road load component, the assistance processing control unit 88 can execute control that is more appropriate for the traveling road surface.

Here, in a case where the environment-originated road load component is more than the threshold value or a case where the amount of change is more than the threshold value, the accuracy of the estimation of the deceleration factors decreases, whereby the accuracy of the drive assistance decreases. Accordingly, in the case where the environment-originated road load component is more than the threshold value or the case where the amount of change is more than the threshold value, the assistance processing control unit 88 stops the drive assistance, whereby the execution of the drive assistance having low accuracy can be suppressed. Therefore, the reliability of the drive assistance can be increased.

In addition, in the case where the environment-originated road load component is more than the threshold value or the case where the amount of change is more than the threshold value, the assistance processing control unit 88 stops the learning of the drive assistance. Accordingly, the learning of a result of traveling performed in an environment different from a normal state as a result of the calculation performed in the state of low accuracy can be suppressed. For example, in the short system learning unit 82, the possibility of learning deceleration and stop that is executed in a state different from the normal state can be reduced. In the middle system learning unit 84, the possibility of learning the slope of the road surface executed in a state different from the normal state can be reduced. In the long system learning unit 86, the possibility of learning the traveling power with which traveling is performed in a state different from the normal state can be reduced. Therefore, the reliability of the drive assistance can be increased.

Here, in a case where the vehicle behavior stability control is in operation, it is preferable that the drive assisting device 1 stop the learning of the drive assistance and the execution of the drive assistance itself.

Figure 21:
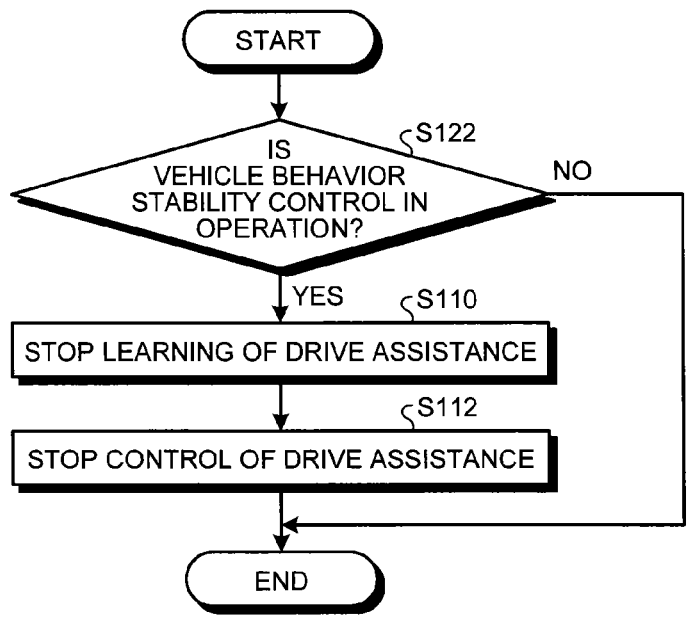
FIG. 21 is a flowchart that illustrates an example of control by the ECU.

FIG. 21 is a flowchart that illustrates an example of control by the ECU. Hereinafter, the processing of a case where the vehicle behavior stability control is in operation will be described with reference to FIG. 21.

In Step S122, the assistance processing control unit 88 determines whether or not the vehicle behavior stability control is in operation. By acquiring a detection result of the vehicle behavior stability control detecting unit 54, the assistance processing control unit 88 can detect whether or not the vehicle behavior stability control (the VCS, the ABS, the TRC, or the like) is in operation. In a case where the vehicle behavior stability control is determined to be in operation (Yes) in Step S122, the assistance processing control unit 88 stops the learning of the drive assistance in Step S110 and stops the control of the drive assistance in Step S112. When the processing of Step S112 is executed, the assistance processing control unit 88 ends this processing. In a case where the vehicle behavior stability control is determined not to be in operation (No) in Step S122, in other words, in a case where the vehicle behavior stability control is determined not to be executed, the assistance processing control unit 88 ends this processing.

As illustrated in FIG. 21, in the case where the vehicle behavior stability control is in operation, the drive assisting device 70 stops the learning of the drive assistance and the execution of the drive assistance, whereby the learning of the drive assistance and the execution of the drive assistance itself can be suppressed in a case where the vehicle behavior stability control is in operation, the accuracy of the estimation of the deceleration factors is in a low state, and traveling is performed in a condition different from the normal state. Accordingly, the drive assisting device 70, similar to the control in FIG. 20, can increase the accuracy of the drive assistance.

Here, in a case where the vehicle behavior stability control is determined to be in operation, it is preferable that the drive assisting device 70 maintain the stopping of the learning of the drive assistance and the execution of the drive assistance itself until a threshold value time elapses. Accordingly, while there is concern that an unstable vehicle behavior continues after the detection of the vehicle behavior stability control, the stopping of the learning of the drive assistance and the execution of the drive assistance itself can be maintained. Therefore, the drive assisting device 70 can increase the accuracy of the drive assistance.

In a case where the vehicle behavior stability control is determined to be in operation, the drive assisting device 70 may change the determination criterion into time. In other words, in a case where the vehicle behavior stability control is determined to be in operation, the drive assisting device 70 may maintain the stopping of the learning of the drive assistance and the execution of the drive assistance itself until the vehicle travels a predetermined distance.

While in a case where a predetermined condition is satisfied in the processing illustrated in FIGS. 20 and 21, the drive assisting device 70 has been described to stop both the learning of the drive assistance and the drive assistance itself, the drive assisting device 70 may stop only any one of them. In addition, while a case has been described in which the drive assisting device 70 of this embodiment executes drive assistance of the short system, the middle system, and the long system, the configuration is not limited thereto. The drive assisting device 70 may be configured to execute drive assistance of only one or two of the short system, the middle system, and the long system.

Note that the deceleration factor estimating device 1 and the drive assisting device 70 according to the above-described embodiments are not limited to the above-described embodiments, but various modifications can be made in the scope described in the claims. The deceleration factor estimating device 1 according to this embodiment may be configured by appropriately combining the constituent elements of the embodiments described above.

The deceleration factor estimating device 1 of this embodiment has been described in a case of estimating the deceleration factors of the vehicle 2 including the engine 5 and the MG (motor-generator) 6, so-called a hybrid vehicle, but the configuration is not limited thereto. The deceleration factor estimating device 1 can perform estimation in a similar manner also in a case of assisting travelling of the vehicle 2 that does not include the MG 6 as a power source but includes only the engine 5 as a power source, so-called a conventional vehicle. In addition, the deceleration factor estimating device 1 can perform a similar estimation also in a case of estimating the deceleration factors of the vehicle 2 that does not include the engine 5 as a power source but includes only the MG (motor-generator) 6 as a power source, so-called an electric vehicle. Similarly, the drive assisting device 70 of this embodiment can assist the driving of a vehicle including various power sources for which deceleration factors can be estimated by the deceleration factor estimating device 1.

REFERENCE SIGNS LIST

1 DECELERATION FACTOR ESTIMATING DEVICE
2 VEHICLE
3 VEHICLE CONTROL SYSTEM
4 HMI DEVICE (ASSISTING DEVICE)
5 ENGINE (INTERNAL-COMBUSTION ENGINE)
6 MOTOR-GENERATOR, MG (ELECTRIC MOTOR)
7 TRANSMISSION
8 BRAKE DEVICE
9 BATTERY
10 VEHICLE SPEED SENSOR
11 ACCELERATION SENSOR
12 YAW RATE SENSOR
13 ACCELERATOR SENSOR
14 BRAKE SENSOR
15 GPS DEVICE
16 WIRELESS COMMUNICATION DEVICE
17 DATABASE
50 ECU
51 VEHICLE CHARACTERISTIC CALCULATING UNIT
52 STORAGE UNIT
53 DRIVE ASSISTING CONTROL UNIT
54 VEHICLE BEHAVIOR STABILITY CONTROL DETECTING UNIT
56 CAN
60 VEHICLE SPEED CALCULATING UNIT

61 ACCELERATION CALCULATING UNIT
62 DRIVING FORCE CALCULATING UNIT
63 VEHICLE WEIGHT CALCULATING UNIT
64 AIR RESISTANCE CALCULATING UNIT
65 ROAD LOAD CALCULATING UNIT
66 VEHICLE WEIGHT ABNORMALITY DETERMINING UNIT
67 FILTERING CALCULATING UNIT
68 ESTIMATION PROCESSING CONTROL UNIT
70 DRIVE ASSISTING DEVICE
81 SHORT SYSTEM ASSISTING UNIT
82 SHORT SYSTEM LEARNING UNIT
83 MIDDLE SYSTEM ASSISTING UNIT
84 MIDDLE SYSTEM LEARNING UNIT
85 LONG SYSTEM ASSISTING UNIT
86 LONG SYSTEM LEARNING UNIT
87 VEHICLE CONTROL UNIT
88 ASSISTANCE PROCESSING CONTROL UNIT

The invention claimed is:

1. A drive assisting device comprising:
a deceleration factor estimating device that estimates a deceleration factor of a vehicle, the deceleration factor estimating device including
a road load calculating unit configured to calculate a road load estimated value, and
a filtering calculating unit configured to perform filtering processing of extracting a predetermined frequency component of the road load estimated value, wherein
the filtering calculating unit extracts a total road load component by performing filtering processing on the road load estimated value with a first time constant,
the filtering calculating unit extracts a vehicle-originated road load component by performing filtering processing on the road load estimated value with a second time constant that has a period longer than that of the first time constant, and
the filtering calculating unit calculates an environment-originated road load component by subtracting the vehicle-originated road load component from the total road load component,
the vehicle-originated road load component includes resistance generated in a drive system that transmits a driving force generated by a driving source,
the environment-originated road load component includes road surface resistance generated between a tire and a road surface; and
a drive assisting control unit configured to execute drive assistance using a deceleration factor estimated by the deceleration factor estimating device, wherein
each of the road load calculating unit, the filtering calculating unit, and the drive assisting control unit is comprised in at least one electronic control unit (ECU).

2. The drive assisting device according to claim 1, wherein the drive assisting control unit stops the drive assistance at the time the environment-originated road load component is a threshold value or more.

3. The drive assisting device according to claim 1, wherein the drive assisting control unit stops the drive assistance at the time an amount of change of the environment-originated road load component is a threshold value or more.

4. The drive assisting device according to claim 1, further comprising:
a vehicle behavior stability control detecting unit configured to detect an operation of vehicle behavior stability control, wherein
the drive assisting control unit stops the drive assistance at the time the operation of the vehicle behavior stability control is detected by the vehicle behavior stability control detecting unit, and
the vehicle behavior stability control detecting unit is comprised in the at least one electronic control unit (ECU).

5. A drive assisting device comprising:
a deceleration factor estimating device that estimates a deceleration factor of a vehicle, the deceleration factor estimating device including
a road load calculating unit configured to calculate a road load estimated value,
a filtering calculating unit configured to perform filtering processing of extracting a predetermined frequency component of the road load estimated value,
a deceleration factor estimating unit configured to include the road load calculating unit and the filtering calculating unit,
a driving force acquiring unit configured to acquire a driving force of the vehicle,
a vehicle speed acquiring unit configured to acquire a vehicle speed of the vehicle, and
an acceleration acquiring unit configured to acquire an acceleration of the vehicle, wherein
the filtering calculating unit extracts a total road load component by performing filtering processing on the road load estimated value with a first time constant,
the filtering calculating unit extracts a vehicle-originated road load component by performing filtering processing on the road load estimated value with a second time constant that has a period longer than that of the first time constant, and
the filtering calculating unit calculates an environment-originated road load component by subtracting the vehicle-originated road load component from the total road load component,
the vehicle-originated road load component includes resistance generated in a drive system that transmits a driving force generated by a driving source,
the environment-originated road load component includes road surface resistance generated between a tire and a road surface, and
the deceleration factor estimating unit estimates a plurality of deceleration factors including the road load estimated value based on a relation among the acquired driving force, the vehicle speed acquired by the vehicle speed acquiring unit, and the acceleration acquired by the acceleration acquiring unit; and
a drive assisting control unit configured to execute drive assistance using a deceleration factor estimated by the deceleration factor estimating device, wherein
each of the road load calculating unit, the filtering calculating unit, the deceleration factor estimating unit, the driving force acquiring unit, the vehicle speed acquiring unit, the acceleration acquiring unit, and the drive assisting control unit is comprised in at least one electronic control unit (ECU).

6. The drive assisting device according to claim 5, wherein the deceleration factor estimating unit determines one deceleration factor to be estimated based on the vehicle speed acquired by the vehicle speed acquiring unit and the acceleration acquired by the acceleration acquiring unit.

7. The drive assisting device according to claim 5, wherein the deceleration factor estimating unit analyzes a relation among the driving force, the vehicle speed acquired by the vehicle speed acquiring unit, and the acceleration acquired by the acceleration acquiring unit by using an equation of motion, and estimates the deceleration factor.

8. A drive assisting device comprising:
a deceleration factor estimating device that estimates a deceleration factor of a vehicle, the deceleration factor estimating device including
a road load calculating unit configured to calculate a road load estimated value,
a filtering calculating unit configured to perform filtering processing of extracting a predetermined frequency component of the road load estimated value,
a deceleration factor estimating unit configured to include the road load calculating unit and the filtering calculating unit,
a driving force acquiring unit configured to acquire a driving force of the vehicle,
a vehicle speed acquiring unit configured to acquire a vehicle speed of the vehicle, and
an acceleration acquiring unit configured to acquire an acceleration of the vehicle, wherein
the filtering calculating unit extracts a total road load component by performing filtering processing on the road load estimated value with a first time constant,
the filtering calculating unit extracts a vehicle-originated road load component by performing filtering processing on the road load estimated value with a second time constant that has a period longer than that of the first time constant, and
the filtering calculating unit calculates an environment-originated road load component by subtracting the vehicle-originated road load component from the total road load component,
the vehicle-originated road load component includes resistance generated in a drive system that transmits a driving force generated by a driving source,
the environment-originated road load component includes road surface resistance generated between a tire and a road surface,
the deceleration factor estimating unit estimates a plurality of deceleration factors including the road load estimated value based on a relation among the acquired driving force, the vehicle speed acquired by the vehicle speed acquiring unit, and the acceleration acquired by the acceleration acquiring unit,
the deceleration factor includes at least one of an air resistance coefficient and a vehicle weight, and
the deceleration factor estimating unit stops estimation of at least one of the air resistance coefficient and the vehicle weight at the time the environment-originated road load component is a threshold value or more; and
a drive assisting control unit configured to execute drive assistance using a deceleration factor estimated by the deceleration factor estimating device, wherein
each of the road load calculating unit, the filtering calculating unit, the deceleration factor estimating unit, the driving force acquiring unit, the vehicle speed acquiring unit, the acceleration acquiring unit, and the drive assisting control unit is comprised in at least one electronic control unit (ECU).

9. The drive assisting device according to claim 8, wherein
the deceleration factor estimating unit determines one deceleration factor to be estimated based on the vehicle speed acquired by the vehicle speed acquiring unit and the acceleration acquired by the acceleration acquiring unit.

10. The drive assisting device according to claim 8, wherein
the deceleration factor estimating unit analyzes a relation among the driving force, the vehicle speed acquired by the vehicle speed acquiring unit, and the acceleration acquired by the acceleration acquiring unit by using an equation of motion, and estimates the deceleration factor.

11. A drive assisting device comprising:
a deceleration factor estimating device that estimates a deceleration factor of a vehicle, the deceleration factor estimating device including
a road load calculating unit configured to calculate a road load estimated value,
a filtering calculating unit configured to perform filtering processing of extracting a predetermined frequency component of the road load estimated value,
a deceleration factor estimating unit configured to include the road load calculating unit and the filtering calculating unit,
a driving force acquiring unit configured to acquire a driving force of the vehicle,
a vehicle speed acquiring unit configured to acquire a vehicle speed of the vehicle, and
an acceleration acquiring unit configured to acquire an acceleration of the vehicle, wherein
the filtering calculating unit extracts a total road load component by performing filtering processing on the road load estimated value with a first time constant,
the filtering calculating unit extracts a vehicle-originated road load component by performing filtering processing on the road load estimated value with a second time constant that has a period longer than that of the first time constant, and
the filtering calculating unit calculates an environment-originated road load component by subtracting the vehicle-originated road load component from the total road load component,
the vehicle-originated road load component includes resistance generated in a drive system that transmits a driving force generated by a driving source,
the environment-originated road load component includes road surface resistance generated between a tire and a road surface,
the deceleration factor estimating unit estimates a plurality of deceleration factors including the road load estimated value based on a relation among the acquired driving force, the vehicle speed acquired by the vehicle speed acquiring unit, and the acceleration acquired by the acceleration acquiring unit,
the deceleration factor includes at least one of an air resistance coefficient and a vehicle weight, and
the deceleration factor estimating unit stops estimation of at least one of the air resistance coefficient and the vehicle weight at the time an amount of change of the environment-originated road load component is a threshold value or more; and
a drive assisting control unit configured to execute drive assistance using a deceleration factor estimated by the deceleration factor estimating device, wherein
each of the road load calculating unit, the filtering calculating unit, the deceleration factor estimating unit, the driving force acquiring unit, the vehicle speed acquiring unit, the acceleration acquiring unit, and the drive assisting control unit is comprised in at least one electronic control unit (ECU).

12. The drive assisting device according to claim 11, wherein
the deceleration factor estimating unit determines one deceleration factor to be estimated based on the vehicle speed acquired by the vehicle speed acquiring unit and the acceleration acquired by the acceleration acquiring unit.

13. The drive assisting device according to claim 11, wherein
the deceleration factor estimating unit analyzes a relation among the driving force, the vehicle speed acquired by the vehicle speed acquiring unit, and the acceleration acquired by the acceleration acquiring unit by using an equation of motion, and estimates the deceleration factor.

14. A drive assisting device comprising:
a deceleration factor estimating device that estimates a deceleration factor of a vehicle, the deceleration factor estimating device including
    a road load calculating unit configured to calculate a road load estimated value,
    a filtering calculating unit configured to perform filtering processing of extracting a predetermined frequency component of the road load estimated value,
    a deceleration factor estimating unit configured to include the road load calculating unit and the filtering calculating unit,
    a driving force acquiring unit configured to acquire a driving force of the vehicle,
    a vehicle speed acquiring unit configured to acquire a vehicle speed of the vehicle, and
    an acceleration acquiring unit configured to acquire an acceleration of the vehicle, wherein
    the filtering calculating unit extracts a total road load component by performing filtering processing on the road load estimated value with a first time constant,
    the filtering calculating unit extracts a vehicle-originated road load component by performing filtering processing on the road load estimated value with a second time constant that has a period longer than that of the first time constant, and
    the filtering calculating unit calculates an environment-originated road load component by subtracting the vehicle-originated road load component from the total road load component,
    the vehicle-originated road load component includes resistance generated in a drive system that transmits a driving force generated by a driving source,
    the environment-originated road load component includes road surface resistance generated between a tire and a road surface,
    the deceleration factor estimating unit estimates a plurality of deceleration factors including the road load estimated value based on a relation among the acquired driving force, the vehicle speed acquired by the vehicle speed acquiring unit, and the acceleration acquired by the acceleration acquiring unit,
    the deceleration factor includes at least one of an air resistance coefficient and a vehicle weight,
    the deceleration factor estimating unit stops estimation of at least one of the air resistance coefficient and the vehicle weight at the time the environment-originated road load component is a threshold value or more, and
    the deceleration factor estimating unit stops estimation of at least one of the air resistance coefficient and the vehicle weight at the time an amount of change of the environment-originated road load component is a threshold value or more; and
a drive assisting control unit configured to execute drive assistance using a deceleration factor estimated by the deceleration factor estimating device, wherein
each of the road load calculating unit, the filtering calculating unit, the deceleration factor estimating unit, the driving force acquiring unit, the vehicle speed acquiring unit, the acceleration acquiring unit, and the drive assisting control unit is comprised in at least one electronic control unit (ECU).

15. The drive assisting device according to claim 14, wherein
the deceleration factor estimating unit determines one deceleration factor to be estimated based on the vehicle speed acquired by the vehicle speed acquiring unit and the acceleration acquired by the acceleration acquiring unit.

16. The drive assisting device according to claim 14, wherein
the deceleration factor estimating unit analyzes a relation among the driving force, the vehicle speed acquired by the vehicle speed acquiring unit, and the acceleration acquired by the acceleration acquiring unit by using an equation of motion, and estimates the deceleration factor.

* * * * *